United States Patent
Ule

[11] 4,009,695
[45] Mar. 1, 1977

[54] PROGRAMMED VALVE SYSTEM FOR INTERNAL COMBUSTION ENGINE

[76] Inventor: Louis A. Ule, 27 Mustang Road, Rolling Hills Estates, Calif. 90274

[22] Filed: Nov. 18, 1974

[21] Appl. No.: 524,406

Related U.S. Application Data

[63] Continuation of Ser. No. 306,399, Nov. 14, 1972, abandoned, which is a continuation of Ser. No. 125,250, March 18, 1971, abandoned.

[52] U.S. Cl. .................... 123/90.13; 123/90.12; 123/140 MC
[51] Int. Cl.² .................................... F01L 9/02
[58] Field of Search ...... 123/140 MC, 90.13, 90.12

[56] References Cited

UNITED STATES PATENTS

| | | | |
|---|---|---|---|
| 1,982,867 | 12/1934 | Hall | 123/90.13 |
| 2,827,884 | 3/1958 | Stivender | 123/90.13 |
| 2,962,013 | 11/1960 | Reggio | 123/90.12 |
| 3,439,662 | 4/1969 | Jones | 123/90.12 |
| 3,534,718 | 10/1970 | Pasquin | 123/90.13 |
| 3,548,793 | 12/1970 | Richardson | 123/90.12 |
| 3,612,015 | 10/1971 | Hausknecht | 123/90.12 |
| 3,682,152 | 8/1972 | Muller-Berner | 123/140 MC |
| 3,727,595 | 4/1973 | Links | 123/90.12 |
| 3,738,337 | 6/1973 | Massie | 123/90.12 |
| 3,741,176 | 6/1973 | Schmidt | 123/90.12 |

Primary Examiner—Charles J. Myhre
Assistant Examiner—Daniel J. O'Connor
Attorney, Agent, or Firm—Dominick Nardelli

[57] ABSTRACT

A family of embodiments of mechanical, electromechanical and electronic for the control of intake and exhaust cylinder valves applicable to both spark and compression ignition engines. Electronic control or programming of valves in respect to their opening and closing times is effected in accordance with predetermined relationships based on data such as air density, engine temperature, engine speed, vehicle speed, fuel octane, automatic transmission data and operator control commands and operating mode selections is provided. The operator control commands include acceleration and deceleration; and the operating mode selections include "computer starting" (without cranking as by a starter mechanism); and constant speed, constant torque, engine reversal, low nitrogen oxide emission, high performance, optimum fuel economy and service modes.

9 Claims, 20 Drawing Figures

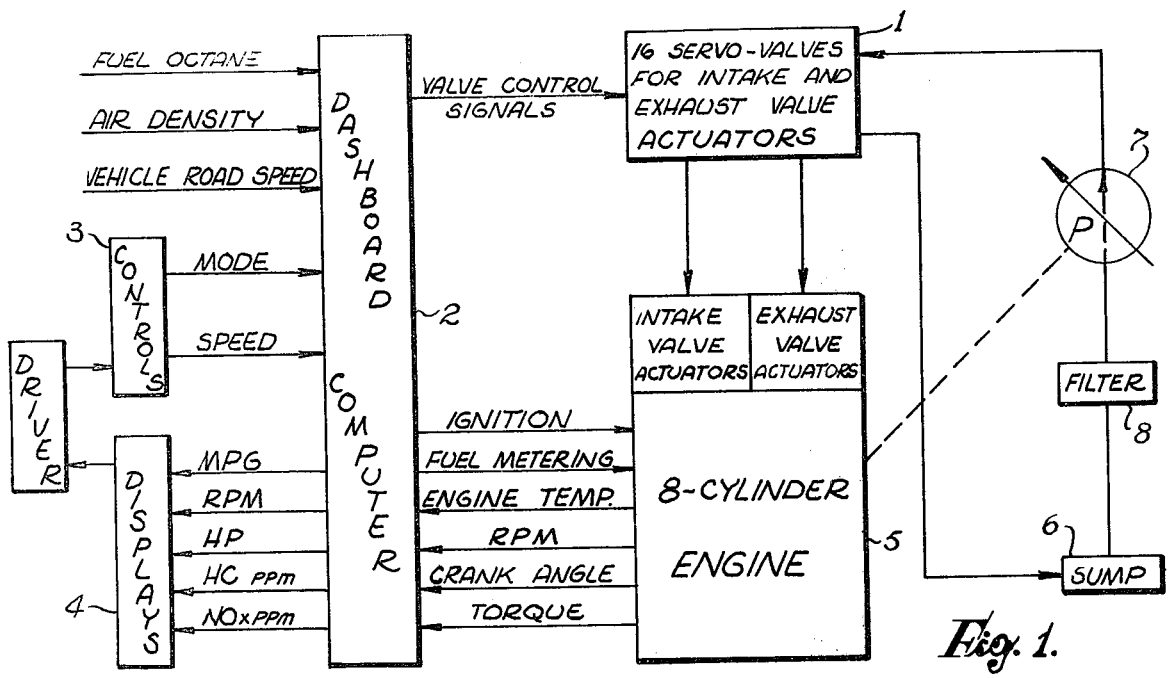
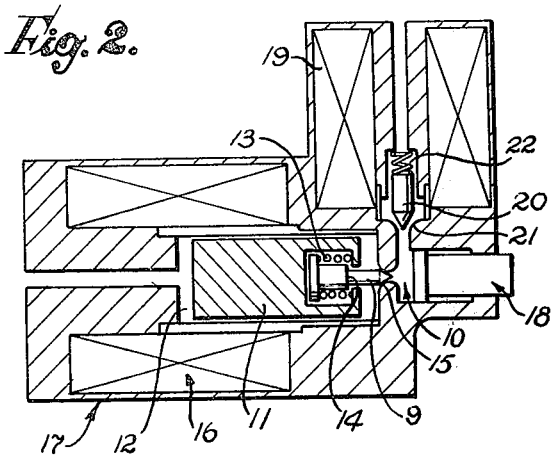
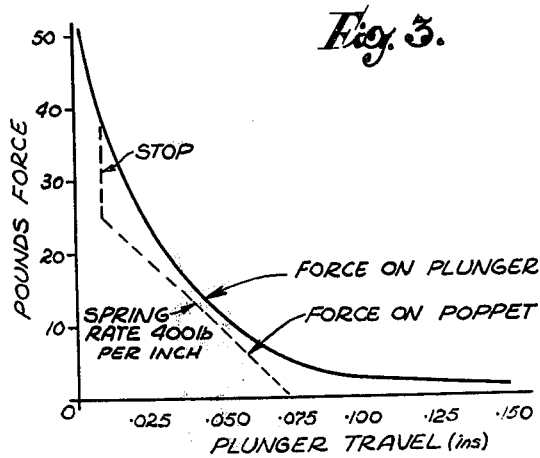
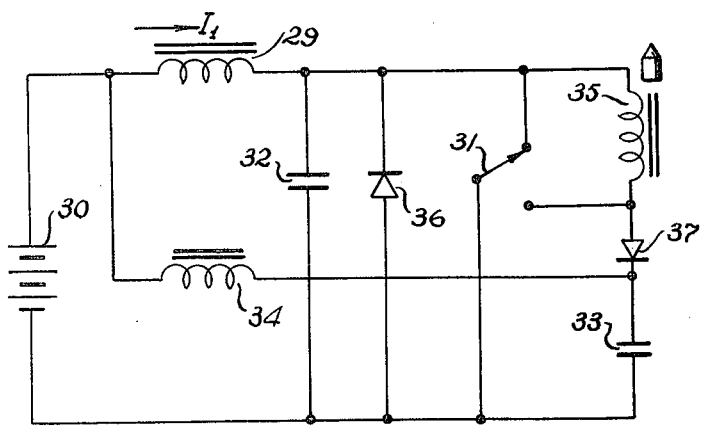

INVENTOR.
LOUIS A. ULE
BY William T. O'Neil
AGENT

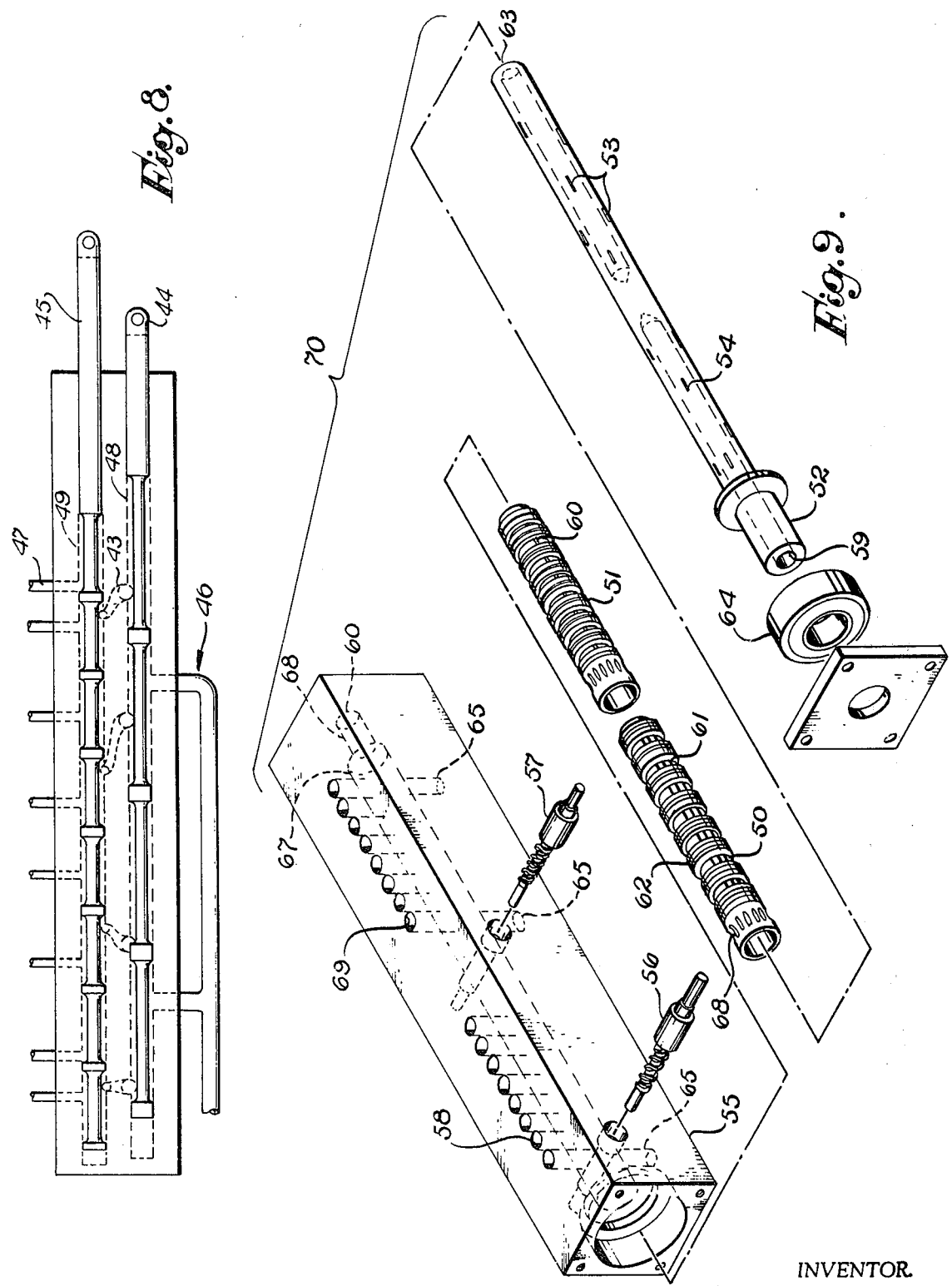

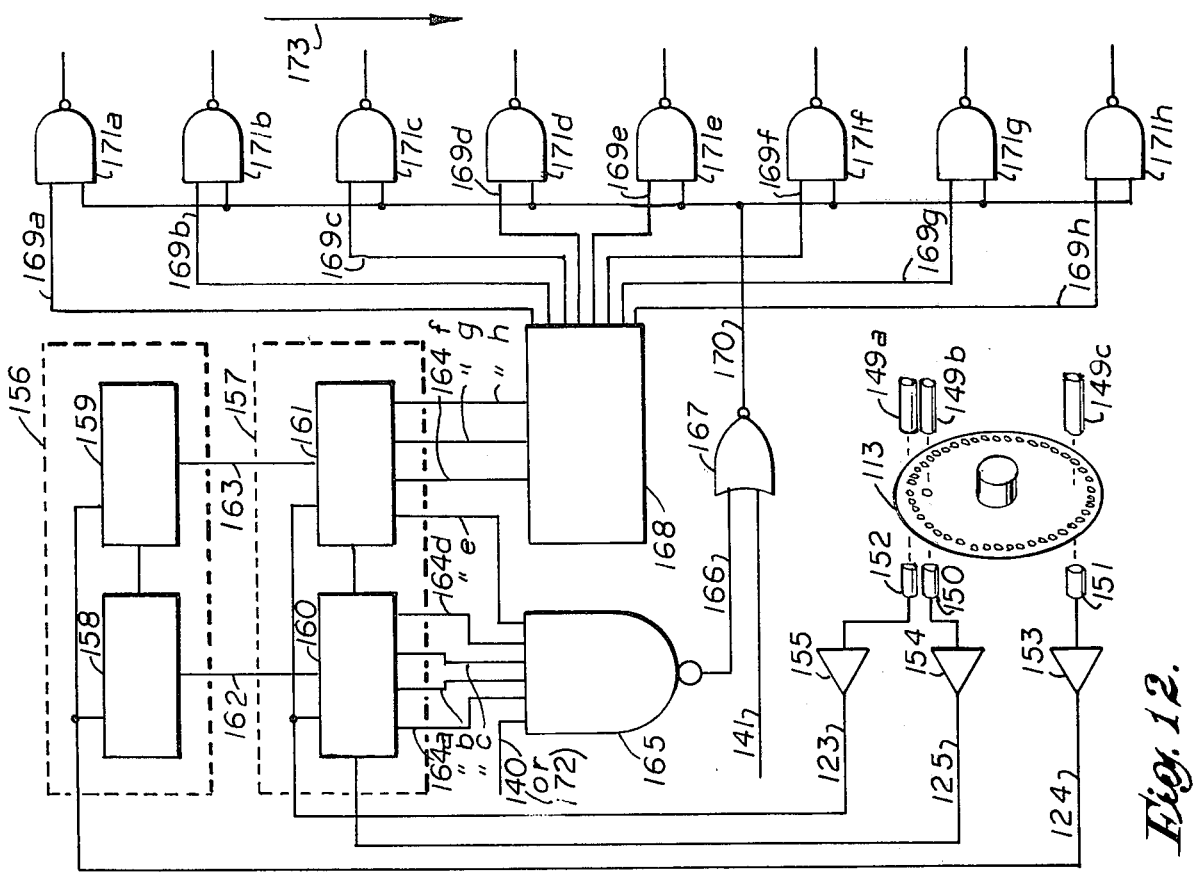

PROGRAMMED VALVE SYSTEM FOR INTERNAL COMBUSTION ENGINE

BACKGROUND OF THE INVENTION

1. Field of The Invention

The present invention relates to cylinder valve control in internal combustion engines, and more particularly, to cylinder valve programming by electronic control means.

2. Description of The Prior Art

The reciprocating internal combustion engine as typified by the universally familiar automobile engine has been subjected to intensive engineering effort in the United States and other industrialized nations throughout nearly all of the twentieth century up to the present. In spite of this effort, there has been little or no change in the basic nature of the fixed timed, cam-operated intake and exhaust valve control systems and the basic carburetor configuration for supplying a fuel/air mixture to the engine.

Various factors, including the urgency of air pollution reduction and the need for substantial operating efficiency improvement to reduce costs, have only comparatively recently focused attention on the basic inefficiencies of such inflexible engine system configurations.

For general background in the pertinent art, the reader is referred to published material as follows:

A comprehensive treatment of both spark-ignition and compression-ignition internal combustion engines is to be found in two volumes by Charles Fayette Taylor entitled "The Internal Combustion Engine in Theory and Practice", 1965, MIT Press. This is one of a vast world-wide and growing collection of literature on this most widely used source of power. The recent literature relative to undesirable exhaust emissions produced by the internal combustion engine and its accessories may be accessed through the NAPC Abstract Bulletin published by the U.S. Public Health Service (Department of Health, Education and Welfare), through the Air Pollution Control Association Abstracts published by the Journal of the Air Pollution Control Association, or through the abstracts of papers published by the Society of Automotive Engineers.

In all the referenced literature, electronic control of an internal combustion engine is discussed only to a very limited degree and then only in the areas of electronic ignition and electronic fuel injection. In the area of electronic ignition, the control of timing is still done mechanically and is predetermined so that the ignition is electronic only in the sense that current interruption to obtain high voltage is performed by transistors rather than directly by metallic contacts (points). Of the various attempts at electronic fuel injection, the most successful are probably those (for a spark ignition engine) which inject the fuel into the space adjacent to each intake valve outside the cylinder. Such systems provide improved performance over a conventional carburetor mainly because the fuel-air mixture ratio is closely controlled (by a small electronic computer, usually) and because it is uniformly distributed to all cylinders. Electronic fuel injection has also proven more stable in adjustment and better adapted to the more rigorous requirements for reducing undesirable emissions, and therefore is a significant improvement in the art as far as it goes.

In effect then, electronic control of engine operation is today limited to the above method of fuel injection. The present invention will be seen to extend this type of electronic control to other engine variables. The principal novel area of electronic control left to be developed is that of the timing of the closing and of the opening of the intake and exhaust valves of the internal combustion engine. In the sense that existing electronic controls have been named 'electronic ignition' and 'electronic fuel injection' the additional electronic controls according to the present invention may be referred to collectively as the "electronic camshaft".

The term "electronic camshaft" here applied pertains to any system of electronic control of the intake and exhaust valves of an engine. A variety of such systems is possible. The practical distinction between the electronic "camshaft" and the conventional mechanical one is that the timing of the latter is usually fixed and cannot be adjusted during engine operation. Electronic control of valve timing will have a degree of flexibility depending on the means employed. Essentially then, the advantages of electronic control of valve timing result from variable control as opposed to the inflexible timing of a mechanical camshaft.

It is well known that a conventional camshaft can provide optimum intake and exhaust valve timing over only a limited range of engine speed and throttle settings, usually near the speed of rated horsepower. At this speed, due to gas momentum in the intake and exhaust passages, high volumetric efficiency is achieved by valve overlap; that is, by the late closing of the exhaust valves and the early opening of the intake valves. To take full advantage of the intake gas momentum the intake valves are also made to close late. These valve timings are not suited to low engine speeds when all valves ideally should open or close near top dead center or bottom dead center. The result is that the modern automobile engine is difficult to start, will not idle slowly and has poor torque at low speeds. At very high engine speeds performance declines again as the masses and spring rates of the valve gear give rise to false valve motion.

The benefits of fully controllable engine intake and exhaust valves at all engine speeds are then appararent from a performance and efficiency standpoint. The engine would be easier to start, have essentially constant torque (at full throttle) over a wide range of speeds and one would be able to drive a car in high gear at lower speeds without stalling.

The power output of an internal combustion engine is essentially the product of engine speed and engine torque. Only engine torque is susceptible to direct control and this by the pressure of the ignited charge during the power stroke. This pressure may be controlled by ignition timing, by mixture ratio and by compression ratio, but the principal means of control is the quantity of charge itself. At full charge the mass of the combustible charge received into the cylinder is a maximum equal to the product of the mixture density and the cylinder displacement. In a conventional engine the mass is controlled by lowering the density of the fuel-air mixture. The density can be reduced by a factor on the order of three by throttling the passage from the carburetor to the intake manifold, and it can also be increased by supplying air to the carburetor at above ambient pressure (Supercharging). There are several disadvantages to throttling as a means of charge control. The engine is required to pump against the intake manifold vacuum when throttled and at idle speeds for a typical engine about one horsepower of engine output is lost in throttle braking. At higher speeds at part throttle, the power lost in pumping is about three horsepower. Not only is intake vacuum an inefficient means of charge control but it is the principal cause of oil seepage past piston rings and intake valve stem guides.

Intake vacuum charge density control also gives rise to rough idle as engine speed is reduced by drawing gases from the exhaust manifold during the time of valve overlap and diluting the mixture. The effect of mixture dilution can only be partly compensated by fuel enrichment.

SUMMARY OF THE INVENTION

In consideration of the principal disadvantages of prior art "fixed cam" valve control systems, the general object of the present invention may be said to have been the development of a valve control system affording maximum flexibility and advantageous operation in the various modes described and to be described.

The present invention, in common with the socalled electronic fuel injection system, exploits the capability of highly reliable electronic (preferably solid-state device) computer techniques for high speed handling of multiple parameter inputs to generate intake and exhaust valve control signals for the engine.

At the outset, the main functional advantages achievable through use of the programmed valve control of the present invention will be related in respect to various engine operational modes and conditions.

With electronic control of intake valve opening and closing, the cylinder charge may be reduced by any fraction from maximum by the late closure of the intake valves. After a full charge is taken into the cylinder any desired part of it may be expelled back into the intake manifold. At idle speeds the engine need not overcome the torque produced by intake manifold vacuum (which subtracts up to six psi from the mean effective pressure during the power stroke) and lower idle speeds are then possible. Further, the absence of an intake vacuum avoids drawing exhaust gases into the cylinder to dilute the charge during idle. The engine may be decelerated quickly without danger of stalling, since the latter phenomenon is largely the result of a sudden increase in intake manifold vacuum which results in a mixture which is momentarily both over-rich and over-diluted.

Electronic intake valve control is particularly economical during engine or vehicle deceleration. When a conventional engine is throttled during deceleration a rich fuel-air mixture is drawn through the idle system of the carburetor, and the increased vacuum vaporizes the liquid fuel in the intake manifold. The over-rich mixture may or may not burn but in either case it represents a waste of fuel.

With intake valve control, the intake valves may be kept closed during deceleration, thus saving fuel and reducing vehicle emissions. A similar effect has already been observed with electronic fuel injection where the fuel is cut off during deceleration.

Where exhaust manifold air injection is used to reduce HC and CO emissions from an automobile engine, intake valve closure during deceleration has the further advantage that it prevents explosions of unburned fuel in the exhaust manifold and so avoids damage to the air injection pump. Thus check valves and other devices designed to protect the pump are not necessary.

It is clear that an engine with electronically controlled intake and exhaust is able to idle at lower speeds. The desired lower limit will vary with circumstances, but in many cases zero speed is as good as any other. The modern automobile engine is made to idle rather than to stall at an intersection "red light" principally because the engine is difficult to start and because of the heavy drain on the battery by the electric starter. With electronic valve control an engine may be started "spontaneously" without an electric starter. Thus for example, just before engine stall, the intake and exhaust valves may be actuated normally to admit a fuel-air-mixture into all cylinders but the mixture would not be ignited. Upon stall, all valves close to trap the combustible mixture in the engine cylinders where it should remain at least at atmospheric pressure for the several minutes that one may stop for a traffic signal. When the accelerator is is depressed the computer would command ignition of cylinder charges in appropriate sequence with a smooth transition to normal valve and ignition timing as the engine picked up speed.

One need hardly enumerate the advantages that would result from the stall versus idle mode in stop-and-go traffic; the saving in fuel, the reduced air pollution and the reduced danger of engine overheating when running idle. Noise reduction would perhaps be the most dramatic; the absence of starter growl and the instant response of the engine to the touch of the accerlator would increase the pleasure of driving. Obviously, there are occasions when engine idle may be preferred to stall, notably when the engine is cold and when accessories such as air conditioners need to be operated. The choice between stall and idle for such routine matters is readily relegated to the engine control computer.

If the engine is not allowed to idle there is no need for a neutral gear nor for a mechanical clutch to first gear since at a stop both engine and vehicle would be synchronized at zero speed. If the neutral gear position is omitted (or disabled in a "drive" mode of the computer) it would not be possible to needlessly race the engine. In short, the vehicle would drive very much like an electric car.

An automobile powered by a conventional internal combustion engine decelerates only slowly when the accelerator is released. In high gear, engine friction contributes little to this deceleration. Intake vacuum alone with a braking effect of five horsepower produces only about 0.01 g deceleration at 60 mph. In an engine with electronically controlled valves, the engine may be operated as an air compressor during deceleration. One way of doing this is to keep the intake valve closed (as noted previously) and to open exhaust valves on the down stroke, close them on the up stroke. This latter mode would produce about 0.2 g deceleration in high gear at 60 mph, and the deceleration would increase as down shifting occurred. Even in high gear the vehicle would be brought to a stop from 60 mph in about 600 feet without the application of brakes.

There are several advantages to this mode of engine braking. The driver need not constantly shift from brake to accelerator in busy traffic; he has essentially a single speed control that is immediately responsive for normal deceleration and he need use the brakes only occasionally. This method of speed control would be particularly useful on downgrades. Even 0.1 g braking force would prevent a car from accelerating on a 10% downgrade and all normal downgrades could be negotiated in high gear. The danger of brake fading due to prolonged application is reduced and should brakes fade due to wetting, this alternative means of braking provides a margin of safety.

When the engine is operated as an air compressor for deceleration, gases are drawn from the exhaust manifold, compressed and returned to the exhaust. The energy dissipated appears as heat in the engine which is well equipped to conduct it away via the engine cooling system. In some instances it would be simpler to have a compression stroke every second revolution of the engine in which case the deceleration torque would be reduced by half. At the other extreme it might also be feasible to ignite the charge at the beginning of the compression stroke to achieve even greater deceleration then by pumping alone.

Exhaust recirculation is now the most practical means for reducing the concentration of nitrogen oxides ($NO_x$) in the exhaust of an internal combustion engine. The fraction of $NO_x$ that appears in the exhaust is an exponntial function of peak combustion temperature and the introduction of inert gases into the charge reduces this temperature by increasing the mass of the gases to be heated (2). Exhaust recirculation of only 15% will reduce $NO_x$ in the exhaust by 85%, yet exhaust recirculation up to 22% is possible without rough engine operation or excessive loss of power. In engines equipped with exhaust air injection as a means of reducing HC and CO emissions, special measures are necessary to obtain exhaust gases free of added air. Even where exhaust gases may be cooled (for greater thermodynamic efficiency) prior to recirculation, it is not advisable to cool them below the condensation temperature of steam.

With the above in mind, one may view exhaust recirculation as an indirect means of increasing the residual fraction, the fraction of combustion products that remain behind in the cylinder and dilute the next charge. Complete scavenging of these combustion products is not feasible, and a typical value for the residual fraction is 7%. This value would correspond to what is now considered zero exhaust recirculation.

With electronic control of exhaust valve closing it is a simple matter to increase the residual fraction to any desired value from 7% to 29%, the latter value corresponding to exhaust recirculation of 22%. At about 25% residual fraction NOx emissions would be reduced by at least 10 to one from 3000 ppm to less than 300 ppm. An increased residual fraction is obtained by early closing of exhaust valves during the exhaust stroke.

The precise timing of exhaust valve closing for optimum control of NOx emissions is not a simple matter. The peak combustion temperatures which give rise to the formation of NOx depend on many factors such as cylinder charge and ignition timing. NOx is not produced during idle or at low throttle settings and performance in this regime need not be compromised by a high residual fraction. An increased residual fraction obtained by early closing of exhaust valves would most commonly be employed when the engine is driven at part throttle at highway speeds. There would be some loss of economy but no loss of performance. When full engine performance is desired for reasons of safety (as in passing) the residual fraction may be temporarily reduced to its minimum value at the expense of some NOx. computerized control of exhaust valve closing as a function of these variables appears to be the most practical means of achieving a compromise between NOx emissions and factors of economy and safety.

The camshaft and valve gear (mechanism) in an internal combustion engine are the principal factors limiting high engine speeds. At higher engine speeds the momentum of the valves, rocker arms and push rods acts to frustrate proper valve operation. More seriously, the mechanical resonance of the valve springs and associated masses tends to amplify what is known as false valve motion so that the mechanical response (and hence the spring rates) of the system need to be much higher than that needed to close the valves quickly. With electronic control of hydraulically actuated valves, the valves open and close at essentially the same rate substantially independent of engine RPM. Further the inertia of the valve gear with hydraulic control is less and lower spring rates may be used.

With electronic control of intake and exhaust valves the internal combustion engine may be made reversible. Thus, for example, there would be no need for a reverse gear in the transmission. This method of providing reverse is commonly employed with electric vehicles. For an electronic internal combustion engine a special transmission is desirable, one that would take advantage of the engine's low speed torque and its electronic controllability.

In the aforementioned Taylor reference, it is shown that a passenger car engine has best fuel economy at low piston speeds (700 to 1400 ft/min) and at relatively high brake mean effective pressures (bmep). Typical fuel consumption in this regime is 0.5 pounds of fuel per hour per brake horsepower. Level road operation of passenger vehicles entails much lower bmep and usually higher piston speeds with fuel consumption from 0.7 to 2.0 lbs per hour per horsepower. This loss of economy is the penalty paid for reserve power for climbing and acceleration. The economy can be recovered by means of overdrive and more gear changes to reduce engine speed and increase the necessary cylinder charge (and hence bmep).

Because of the better low speed torque of the electronically controlled engine, a lower rear-axle ratio could be used in overdrive with a further increase in fuel economy. This mode of operation does, however, compromise the control of NOx emissions because of the increased peak combustion temperature that results, and would be used only in country driving where some NOx can be tolerated.

The foregoing discussion will serve to thoroughly acquaint the reader with the possibilities and variations available with the present invention applied to an automobile engine. It is, of course, not mandatory that all of the fore-going valve programming possibilities and vehicle functional modes be implemented in order for the present invention to afford very significant improvement in vehicle operation and economy.

Inasmuch as an internal combustion engine having intake and exhaust valves whose opening and closing are susceptible to electronic control while the engine is running, is more efficient, easier to start, easier to control in a variety of useful modes, and cleaner in respect to air pollution, four embodiments are hereinafter described for effecting such electronic control. These four concepts all employ hydraulic power supplied to hydraulic actuators mounted above the intake and exhaust valve stems in place of the usual valve mechanism comprising camshaft, push rods and rocker arm assemblies. No change is contemplated in the design of the intake or exhaust valves themselves as heretofore constructed, except that the valve spring rates may be reduced somewhat because of the reduced mass of the valve mechanism. Further, although the description of these four embodiments assumes hydraulic power, the concepts themselves are to a large extent compatible with other power, such as pneumatic or tapped combustion gases from the firing chambers. The four concepts are alike generically but differ in the means employed to control the switching of hydraulic fluid to the intake and exhaust valve actuators, as follows:

1. Fluid switching by electronically controlled servo valves. These valves require very little electrical power but a substantial amount of hydraulic power due to leakage. They are relatively expensive but would operate at very high engine speeds.

2. Fluid switching by solenoid actuated pintle valves having minimal hydraulic leakage but requiring substantial electrical power. These valves are relatively less suited to high speed engine operation.

3. A system of engine driven spool valves in two stages whose timing is adjusted by a mechanical differential interposed between the engine crankshaft and the valve drive shaft. These valves require only moderate electrical and hydraulic power but do not allow independent opening and closing of the intake and exhaust valves, rather, the period of opening is a fixed number of crank angle degrees.

An engine driven rotary valve having two adjustable sleeves, one each to allow independent timing of the opening and of the closing of the engine intake or exhaust valves. This rotary valve requires only moderate electrical and hydraulic power, yet allows extremely versatile control of the engine.

In addition to the above four embodiments for making electronic valving feasible, the following additional concepts for exploiting electronic valve control are also recognized.

Following are four functional concepts realizable through the foregoing valve switching embodiments:

1. Control of engine power by means of the timing of the closing of the intake valves, rather than by throttling and intake manifold vacuum, thus avoiding the loss of power in pumping the intake manifold vacuum, thus greatly reducing oil seepage past piston rings and intake valve stem guides and preventing the drawing in of exhaust gases into the fuel-air mixture at low engine speeds due to intake manifold vacuum.

2. Closing of intake valves during deceleration to prevent loss of fuel, to reduce HC (hydrocarbon) and CO emissions, and to allow the engine to be decelerated through operation as an "air compressor".

3. During deceleration, with the intake valves closed as noted, to use the exhaust valves in an "air compressor" mode to provide positive, safe and continuously variable deceleration of the engine or vehicle.

4. Early closure of exhaust valves to trap a portion of the exhaust gases in the cylinder wherewith to dilute the next charge and thereby to reduce the formation of nitrogen oxides ($NO_x$) to a figure below 300 PPM by virtue of the resulting reduced peak combustion temperature.

5. Optimum timing of engine intake and exhaust valves at all speeds to allow lower idle speed, improved low speed torque and higher engine top speeds.

6. Computer controlled operation of engine valve opening and closure while the engine is stalled to charge the cylinders with a fresh fuel-air mixture whereby to start the engine by computer controlled application of ignition to proper sequence in response to accelerator pedal operation.

7. Improved control of the fuel-air mixture during acceleration and deceleration by virtue of a constant air intake manifold pressure and the avoidance of sudden drastic changes in intake manifold vacuum which conventionally leads to uncontrolled evaporation or precipitation of fuel and consequent stalling on deceleration or stumbling on acceleration.

8. Improved control of the fuel-air mixture by supplying fuel in metered amounts to premix chambers in the vicinity of each intake valve, the fuel required being computed on a make-up basis as the product of the mass of air taken into the cylinder in the previous cycle times the desired fuel to air mixture ratio.

9. Computer operation of the engine selectively in any one of the following modes:

a. Speed control mode. The engine to accelerate the vehicle to a speed corresponding to the position of the speed controller (conventionally the accelerator pedal) and at an acceleration proportional to the difference between the desired and actual speed, with any desired deceleration to a certain maximum obtained by operating the engine as an air compressor.

b. Economy mode. The engine to operate at the lowest speed that will deliver the necessary drive torque, using overdrive gears as required, wherever the relatively high production of $NO_x$ is not significant and reduced ability to accelerate without down-shifting is not significant.

c. High performance mode. The engine to operate at low torque and higher speed to achieve the same horsepower, with some reduction from optimum economy, but with the ability to increase torque quickly in the same gear for fast acceleration. Except in acceleration, there would be reduced $NO_x$ emissions.

d. Low Emissions Mode. Reduced $NO_x$ emissions by means of exhaust recirculation effected by the early closing of exhaust valves where this consideration is superior to achievement of optimum economy and power.

e. Service Mode. In this position the engine could be idled or raced with the computer programmed to provide diagnostic data.

f. A Starting Mode. When the engine is stalled, the computer is programmed to initiate a starting procedure when the accelerator pedal is depressed.

g. No-Idle Mode. Simulating an electric vehicle, the engine would stall when the vehicle comes to a stop, thereby reducing all forms of air pollution, preventing engine overheating and saving fuel in stop-and-go traffic.

BRIEF DESCRIPTION OF THE DRAWINGS

FIG. 1 is a block diagram of an internal combustion engine equipped with servovalves, a hydraulic control system, hydraulic valve actuators, and a computer, an embodiment of the invention which uses conventional components.

FIG. 2 illustrates a hydraulic fluid control valve and attached engine valve actuator employing two solenoid controlled pintle valves, one to admit hydraulic fluid into the actuator cylinder, the other to drain it.

FIG. 3 is a graph showing typical force in pounds produced on the inlet pintle of the solenoid controlled valve and demonstrating how a long solenoid plunger stroke is obtained in combination with a high initial pull on the pintle.

FIG. 4 is a circuit diagram which provides means for speeding up the actuation of the solenoid plunger, both in opening the valve and in allowing it to close, with an electrical energy recovery feature.

FIG. 8 is a drawing of the two stage spool valve shown schematically at FIG. 7.

FIG. 9 is a drawing of an engine-driven rotary hydraulic control valve equipped with timing sleeves which allow independent timing of the opening and of the closing of engine intake (or exhaust) valves.

FIG. 12 is a simplified schematic of the basic timing circuit employed by the computer for valve and ignition timing.

FIG. 13 is a simplified schematic of a timing computer employing a binary counter and a monostable multivibrator to compute the advance in the opening of the engine's intake valves.

FIG. 14 is a simplified schematic of a timing computer which computes relative timing delay or advance in the closing of the intake valves.

DESCRIPTION OF THE PREFERRED EMBODIMENTS

Figure 5:
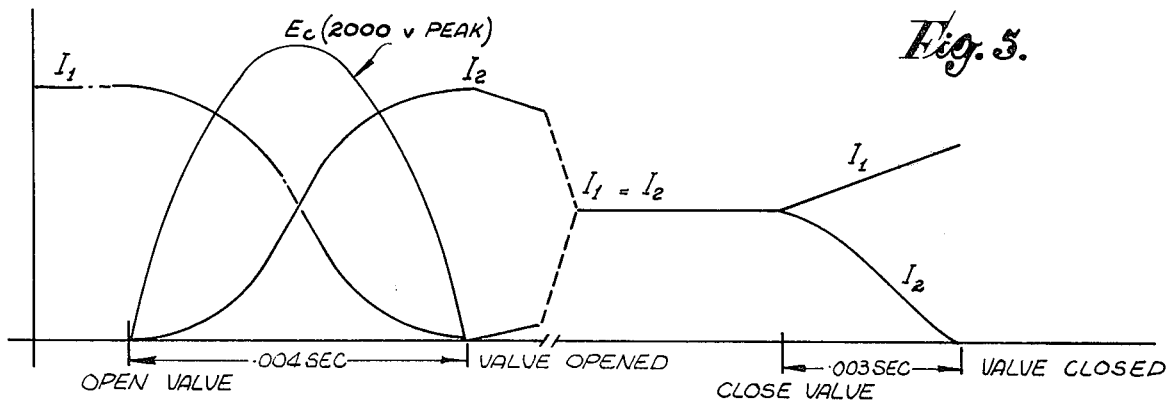
FIG. 5 shows the voltage and current waveforms during solenoid actuation for the circuit of FIG. 4.

Referring now to FIG. 1, an embodiment having two-stage hydraulic servo-valves, a fluidic amplifier to transform a weak electrical control signal into a hydraulic force capable of rapidly and reliably switching hydraulic fluid to hydraulic actuators is shown. That device is capable of operating at a rate of 200 cycles per second. This arrangement would allow the attainment of controlled hydraulic power sufficient to actuate the intake and exhaust valves of a conventional engine as, for example, a V-8 internal combustion engine of 300 cu. inch displacement requiring 16 such servo-valves, shown collectively in block 1. Eight of these are for the exhaust and eight are for the intake valve actuators also shown collectively as part of the engine 5. In this embodiment, the engine would not have a camshaft but instead, the engine crank angle would be fed to the computer 2 which would compute the desired times of opening and of closing of all engine valves. The engine intake and exhaust valves would be designed in the conventional manner except for valve spring rates accommodated to hydraulic (rather than camshaft) actuation, and they would be actuated by thimble sized (at 600 to 3000 psi hydraulic pressure) hydraulic actuators mounted directly over the valve stems, eliminating the conventional prior art push rod and rocker arm assembly. Power to operate the servo-valves and the valve actuators would be derived from a conventional hydraulic supply comprised of a sump 6, a fluid filter 8 and a variable displacement pump 7 driven by the engine 5. When the engine 5 is stalled, hydraulic power could be derived either from an accumulator or an auxiliary electrically driven pump, neither of which is shown, but both of which are well known of themselves.

In this embodiment the computer would control ignition timing and fuel metering as well as valve timing in response to controls 3 and other inputs from instruments that provide information on fuel octane, air density, engine temperature, vehicle speed, engine RPM and crank angle. The computer would control the engine according to a desired program or mode, to obtain a desired output such as speed, acceleration or torque. The mode selection would be at the discretion of the operator. Among others, the following useful modes may be provided: computer starting of a stalled engine, engine reversal, road speed in response to accelerator pedal position, a low emissions mode, a high economy mode, a high performance mode, and a controlled torque mode for negotiating slippery roads. Implicit in all these modes is optimum valve timing and programming to enhance efficiency and torque at both low and at high speeds, the use of intake valve control in place of a throttle to control engine torque (and consequently engine power at a given speed), the elimination of intake manifold vacuum with its undesirable effects on oil consumption, engine braking, and fuel-air mixture in acceleration and deceleration, the closing of intake valves to conserve fuel and reduce emissions during deceleration, the operation of exhaust valves in deceleration to provide controllable engine braking by pumping, and exhaust recirculation by early closing of exhaust valves to reduce $NO_x$ emissions.

The embodiment using two-stage-servo-valves, while requiring little electrical power, consumes substantial hydraulic power in leakage. The servo-valves, though expensive, offer a versatility in performance somewhat in excess of need. A device which circumvents these difficulties is shown in FIG. 2, and employs pintle valves which can control hydraulic fluid with negligible leakage without requiring extreme precision in manufacture. The pintle 9 that opens to admit hydraulic fluid to the cylinder 10, is held closed by hydraulic pressure with a force typically 30 pounds. On the other hand the force that is produced by a solenoid plunger 11 when the gap 12 is open, is relatively small, about 6 pounds as shown in FIG. 3, though the force approaches 55 pounds when the gap is closed. In order to apply a maximum of initial force to the pintle 9 so as to ensure its opening, and yet to provide a generous travel of the pintle against the venturi force of the inrushing hydraulic fluid as the pintle opens, the pintle 9 itself is mechanically coupled to the plunger 11 by means of a spring 13 and a shoulder 14. The rate of the spring 13 is selected so that the force of the spring is less than the corresponding magnetic force on the plunger until the plunger 11 positively engages the pintle 11 at its shoulder 14. The force on the spring 13 at a displacement corresponding to engagement of the pintle shoulder 14 is selected so as to exceed the force required to pull the pintle 9 open. At this instant also, the impact of the heavier plunger 11 upon the shoulder 14 of the pintle insures the cracking open of the inlet valve, which when accomplished, reduces the retarding force on the plunger 11 while the magnetic force rapidly increases as the plunger gap 12 closes. Once the pintle 9 has retracted sufficiently from the pintle valve seat 15 to reduce venturi force on the pintle, the pintle 9 will further retract to the full open position by the force of the compressed valve spring 13.

In this solenoid valve design, there is a solenoid 16 with ferrous cladding 17 which serves to open the inlet pintle 9 when it is energized, thus admitting hydraulic fluid into the piston 10 in order to actuate the piston 18. At the same time that the inlet solenoid 16 is energized, the outlet solenoid 19 is also energized in order to force the magnetic outlet pintle 20 against the seat 21. The magnetic design is such that a very high closing force is obtained with relatively little electrical energy (by virtue of the fact that, for a given magnetic flux, the magnetic force is inversely proportional to the area of the gap, here made very small for that purpose), since the outlet pintle 20 is not required to do any work, that is, it is not required to move against an opposing force. To further insure that the outlet pintle 20 will be initially closed, a spring 22 holds the pintle closed until, after de-energization of the outlet solenoid 19, the force of the engine intake (or exhaust) valve spring, not shown, acting on the piston 18 forces it to retract and open the outlet pintle, thereby allowing the hydraulic fluid to drain. In this design, hydraulic pressure is used to open the respective intake (or exhaust) valve on the engine, but conventional valve springs are used both to close the valves and to force the valve actuator pistons to retract; that is, the valve actuators are single-acting with spring return.

Figure 6:
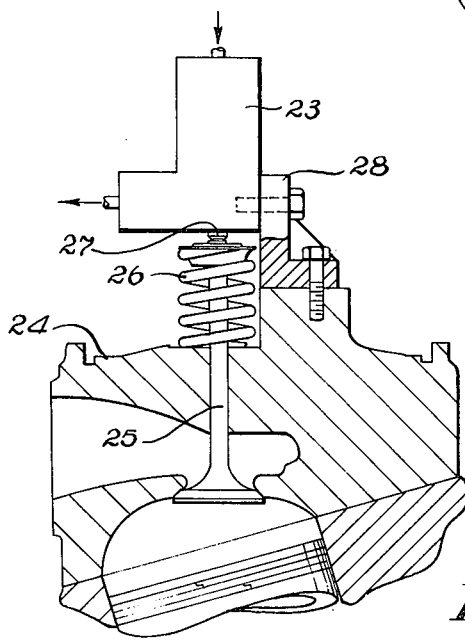
FIG. 6 illustrates the mounting of a set of solenoid actuated valves of FIG. 2 above an engine intake or exhaust valve.

One form of mounting of the valve actuators with associated solenoid control hydraulic valves on an internal combustion engine is shown in FIG. 6 where the solenoid valve actuator 23 just described, is mounted directly above the stem 25 of the associated intake or exhaust valve. The solenoid valve actuators 23 thus replace the conventional prior art rocker arm and push rod assemblies and are held in place on the cylinder head 24 by means of a bracket 28. The relationship between the rod 27 of the hydraulic actuator with respect to the valve stem 25 is as shown, and the manner in which the conventional valve spring 26 causes the valve actuator to retract when hydraulic pressure is removed will be understood. It is clear in this design, that when all solenoid valve actuators are electrically deenergized, the force of the valve springs would cause all engine valves, both intake and exhaust, to close, a desirable feature in trapping a combustible fuel-air mixture to enable subsequent restarting of the engine by computer controlled application of ignition to the cylinders in proper order.

Although the solenoid valve of FIG. 2 may take only six watts of power in the steady state, integration of the work done by the inlet pintle 9 as shown on the force-displacement diagram of FIG. 3 indicates that about one foot-pound of work is required to open the inlet pintle against a typical hydraulic pressure of 3000 psi. It is clear, that in an internal combustion engine, this work must be accomplished in a few milliseconds; the implication being that the instantaneous mechanical power may be 150 watts compared to the 6 watts of steady power. This power may be delivered by applying a very high voltage to the solenoid at the instant actuation is desired, or one may use a typical 12 volt DC power supply in conjunction with the circuit of FIG. 4.

In the FIG. 4 circuit, the energy to be delivered to the solenoid valve is stored in an energy storage coil 29 which in the "close valve" position of switch 31 is connected across the battery 30 for a time sufficient to energize it fully. In this position of switch 31, the "turn-on" capacitor 32 and "turn off" capacitor 33 will be normally discharged, and there will be no current either in the solenoid 35 or in the energy recovery coil 34. When the switch 31, which may be replaced with a transistor circuit, is turned to the "open valve" position, the current in the energy storage coil 29 cannot at once switch to the solenoid 35, nor can it flow through the diode 36. It is therefore constrained to charge up the turn-on capacitor 34, the capacitance of which can be selected to be such that its voltage will quickly rise to a thousand or more volts (as shown in FIG. 5). This voltage, appearing directly across the solenoid 35, causes it to be energized far more quickly than if it were connected directly across the battery having a typical voltage of only 12 volts. Eventually the current in the energy storage coil 29 goes to zero, and concurrently, the current in the solenoid 35 reaches its maximum. If switch 31 is allowed to remain in the "open valve" position, the current in the energy storage coil 29 would rise and that in the solenoid 35 would fall until both currents were equal to a value typically one-half the original current in the energy storage coil 29, as is also shown in the current waveforms of FIG. 5. Eventually the voltage across the turn-on capacitor would of course, be equal to the battery voltage.

When the switch 31 is returned to the "close valve" position, the current in the energy storage coil begins to build up. Current in the solenoid has only two paths, one through the energy-recovery coil 34 whose current can only be increased gradually, and the other through the turn-off capacitor 33 whose capacitance can be made such that the current in the solenoid 35 is quickly reduced to zero by charging the turn-off capacitor 33 to a very high voltage. When the solenoid 35 has been completely discharged the diode 37 prevents it from being recharged in the reverse direction, and the high voltage on the turn-off capacitor 33 can only produce a current through the energy-recovery coil 34 which returns the energy to the battery, theoretically without loss. In this circuit as described, not only is rapid actuation and de-actuation possible, but except for copper, iron, and mechanical work losses, all energy is returned to the battery, and the possibility exists, if the hydraulic system (as it does) in opening the magnetic gaps on both inlet and outlet solenoids, opens them with sufficient force, that some hydraulic power will be converted to electrical power. Accordingly, essentially no electrical power may be required. In spite of these advantages, an embodiment of an electronic internal combustion engine employing such solenoid hydraulic valves instead of servo-valves as shown in the block diagram of FIG. 1 would be most effective where high engine speeds were not contemplated. Although this embodiment allows rapid actuation of the solenoids, equally rapid energization of the energy storage coils required at higher engine speeds is not as readily achieved. Further, for an eight cylinder engine, 16 circuits such as shown in FIG. 4, would be required along with a total of 32 energy-handling coils. The resulting equipment bulk would not be optimum for automotive use.

Figure 7:
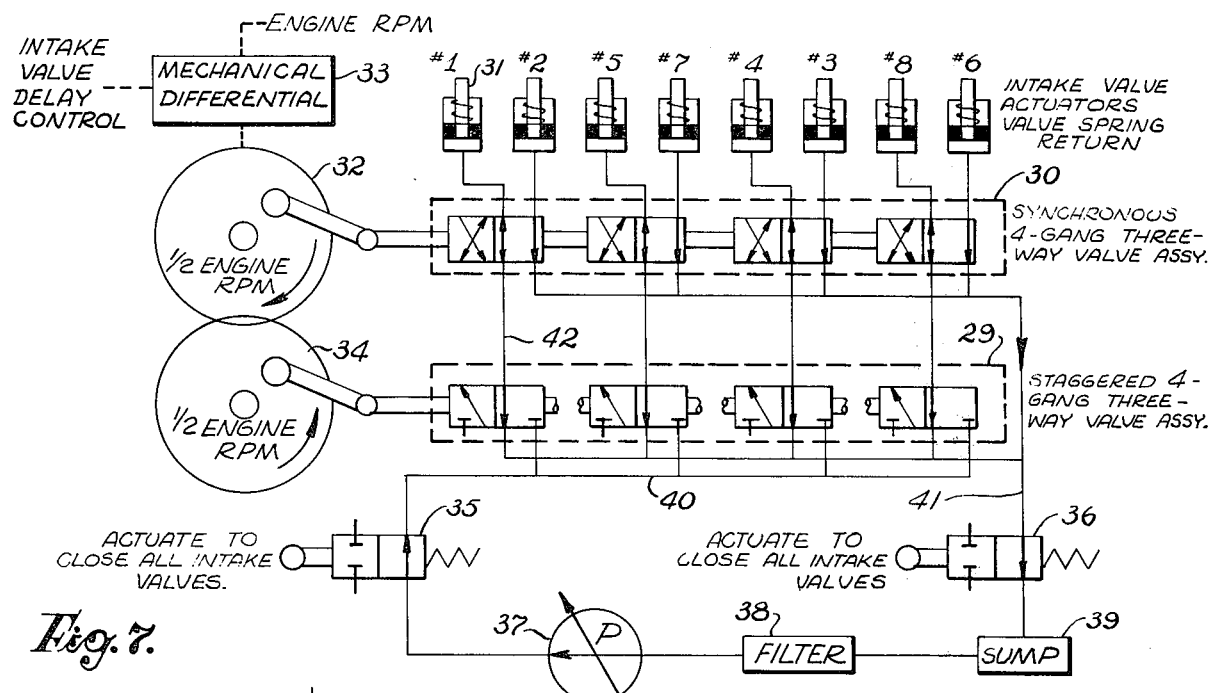
FIG. 7 is a schematic of a hydraulic valve control system using engine-driven multiple-ganged spool valves in cascade.

Referring now to FIG. 7, an embodiment using hydraulic spool valves will be described. It is possible to construct a conventional hydraulic spool valve so as to accommodate several spools on the same rod (ganged) and with apertures in the bore so spaced that, as the rod is advanced, the individual spools will alternately connect hydraulic actuators to the hydraulic supply and to the hydraulic drain in any desired sequence and function of rod position; it is, however, another matter to have the switching sequence repeated over and over in the same order, since, as the rod is retracted, as it eventually must be, the switching sequence will be executed in reverse order. If a multiple-ganged spool valve is used to switch hydraulic fluid to actuators for the intake and exhaust valves of the engine, it must be designed to execute a particular switching sequence (such as actuator 1, 5, 4, 8, 6, 3, 7, 2 for a V-8 engine) repetitively without reversal. How this may be done by a two-stage spool valve is demonstrated in the schematic of FIG. 7. When driven in the forward direction, the first stage pool 29, having a rod with four spools, will correctly switch fluid to valve actuators for cylinders 1, 5, 4, 8 (in that order), connecting the respective actuators 31 to the hydraulic supply 40 when the respective intake (or exhaust) valve is to be open, then to the drain 41 when the respective valve is to close. During the time of forward travel of the first stage spool 29, the second stage spool 39 simultaneously connects the four control ports 42 of the first stage spool 29 to the respective actuators 1, 5, 4, 8, above mentioned; conversely, when the first stage spool 29 retracts, the second stage spool simultaneously connects these four ports of the first stage spool to valve actuators 2, 7, 3 and 6, which being traversed in the reverse order execute the desired sequence 1, 5, 4, 8, 2, 7, 3, 6 (or other desired sequence suitable for a particular engine). The proper motion of the rods in the first and second stages of this valve is obtained when they are driven 90° out of phase by a crank 32 and 33 turning at one half the engine rpm. This design is successful because there is considerable overlap in the time in which (intake or exhaust) valves are, some of them, simultaneously open, and further, because the two rods are driven 90° out of phase, it is easily arranged for no fluid switching to be or to need to be done by either rod when it is at either extremity of its travel. The two stage spool valve, once it is built and installed in an engine, does not allow for independent timing of the opening and of the closing of the intake (or exhaust) valves; the period or crank angle during which an intake (or exhaust) valve will be opened is fixed in duration by the design, though the duration may differ for the intake and for the exhaust valves since separate two-stage spool valve assemblies are required for each. In order to control the timing of the valves with respect to engine crank angle, a mechanical differential 33 is interposed between the engine and the reciprocating valve drive. Further, all intake valves may be closed (as desirable during deceleration) on the engine by closing off, (by means of a solenoid valve 35), the hydraulic supply 40 to the two-stage spool valve for the intake valves. In a similar manner, while the engine is turning (or the two stage valve is caused to turn with the engine stalled) one may open all intake valves (as one available means of introducing fuel-air mixture to a stalled engine) by closing off the drain connection 41 by means of solenoid valve 36.

A variable displacement pump 37, fluid filter 38 and sump 39, supply the hydraulic power required. The pump being driven by the engine, is equipped with auxiliary electric drive for use when the engine is stalled.

A cross sectional view of the two stage spool valve of the arrangement of FIG. 7 is shown in FIG. 8. Here, in order to reduce the length of the four passages 43 from the first stage bore 48 to the second stage bore 49, the spacings between the four spools on the first stage rod 44 are double those of the second stage rod 45, the latter having eight spools, one for each cylinder of the engine. There are only two inlets for the hydraulic supply connected by the manifold 46. The spacing between the control ports 47 which connect directly to single-acting valve actuators mounted above each intake (or exhaust) valve, is carefully computed to provide switching of hydraulic fluid at precise crank angles, taking into account the non-linear motion of the reciprocating drive, which is not shown.

Referring now to FIG. 9, an embodiment using engine-driven rotary hydraulic valves will be described. A rotary hydraulic control valve having timing sleeves which allow independent timing of opening and closing of engine intake (or exhaust) valves is illustrated. Such a valve is naturally adapted to repeating the firing sequence of an internal combustion engine in the same order while rotating uniformly in one direction. Further, by interposing a timing sleeve 51 between the rotor 52 and the valve body 55, one can adjust the angle at which a particular valve actuator is connected to the drain by the drain sleeve 50, or to the supply by the supply sleeve 51. Special features in this valve design allow control of internal leakage and losses to acceptable levels, and these will be described.

With the valve assembled, hydraulic fluid under pressure enters the body at an inlet fitting 60 and is admitted to a passage 63 bored in the far end of the rotor 52; this passage opening on eight ports typically 53, spaced along and circumferentially about the rotor, one port for each cylinder of the engine. To prevent excessive radial forces between the rotor 52 and the supply sleeve 51, the ports in the rotor are spaced at 135°, rather than the more obvious 45° for an eight cylinder engine, so that radial forces on the supply sleeve tend to cancel out. It is important that radial forces be minimized, since they tend to increase clearances between the rotor and the timing sleeves in the vicinity of the ports in the rotor. These increased clearances aggravate the problem of internal leakage; further, the high radial forces, amounting to several hundred pounds in a typical design, would increase friction and wear on the opposite side circumferentially, and thereby reduce valve life. Similar remarks apply to the drain end of the rotor 59, where drain ports 54 are also spaced at 135 degree intervals, as well as axially along the rotor, serving to minimize radial forces between this portion of the rotor and the drain sleeve 50. The drain passage 59 is bored into the rotor 52 from the drive end and is isolated from the supply passage 63 by a barrier. Since the hydraulic fluid from the drive end of the rotor flows into a low pressure sump, there are no peculiar problems of leakage at this point.

To prevent axial forces on the sleeves, low pressure areas are provided by means of internal drains 65 at either end of each sleeve. Further, the hydraulic pressure at the body inlet 60 is isolated from the far end drain by a close fit between the rotor 52 and a corresponding bore 66 in the body extended to provide a long leakage path. The center drain not only prevents leakage from producing axial forces on the two sleeves, but isolates hydraulic pressure from the control worm 57 (or the supply sleeve 60), the said worm 57 operates by engaging recessed threads 68. The body drain 65 at the drive end of the rotor serves to prevent axial hydraulic force on the drain sleeve 62 and to prevent external leakage through the thrust bearing 64. The latter bearing not only takes the force of several hundred pounds produced by hydraulic pressure on the rotor from the supply end, but also radial loads on the rotor produced by a gear or chain belt drive.

Internal leakage between control ports for individual valve actuators is controlled by a close and precise fit between the rotor 52 and the two timing sleeves, 50 and 51, and by means of balanced forces on the rotor, tending to center it in the two sleeves. These balanced forces are produced by proper arrangement of ports in the rotor. The same 135° spacing in the rotor ports that is conductive to balancing forces also increases the leakage path between adjacent ports compared to that which would be extant for the aforementioned 45° spacing. Further, since the rotor will rotate up to several thousand rpm, the time of leakage will be very short, and leakage at normal and at high engine speeds would be negligible.

Leakage between adjacent fluid passages in the interface between the timing sleeves and the body is controlled by conventional O-rings, since there is little relative motion between the sleeves and the body and no fluid switching takes place at this interface. The required tolerance in the clearance between the outside diameter of the timing sleeves 50 and 51 and the corresponding body bore 67 is therefore relatively generous.

The manner of operation of the hydraulic rotary control valve is as follows. Hydraulic fluid under pressure enters the supply passage 63 in the rotor 52 and is normally blocked from further passage by encountering the supply sleeve 51 which closes off most of the ports 53 in the supply end of the rotor. As the rotor turns, however, a particular port in the rotor will open upon a mating aperture 60 in the supply sleeve. These apertures, to be found in both timing sleeves, provide entrance to a circumferential groove cut into the outside of the timing sleeves, one groove for each aperture in either sleeve. These grooves in either sleeve are aligned with exit holes 69 for the supply sleeve (or inlet holes 58 for the drain sleeve), so that at the instant a port 53 on the rotor encounters an aperture 60 on the supply sleeve, hydraulic fluid will flow from the passage inside the rotor, through the rotor port, past the sleeve aperture 60, around the corresponding groove in the sleeve to the corresponding exit hole and thence out the valve body. In a corresponding manner, hydraulic fluid returning from a valve actuator will enter an inlet hole 58 above the drain sleeve 50, enter the corresponding groove on that sleeve and be normally blocked from escaping out through the drain end of the rotor by the interposed drain sleeve 50 until the rotor has turned sufficiently to allow a drain port 54 on the rotor to encounter the corresponding aperture 61 on the drain sleeve to provide a clear passage for the fluid to drain. Since an engine's valves are closed most of the time, the drain sleeve 50 is provided with a series of apertures following the opening aperture in any groove, to insure that the corresponding valve in the engine (intake or exhaust) has had sufficient time to close, inasmuch as valve closing is effected by the valve springs only and these springs are also required to pump the fluid back to the drain and therefore will not close so quickly as they were opened. These apertures on the drain sleeve extend over 180° of rotation and thereby also simplify the process of reversing the direction of the engine, should that be desired.

A further elucidation of the manner in which the rotary hydraulic control valve is used to switch hydraulic fluid to the hydraulic actuators for the intake (or exhaust) valves of an internal combustion engine, it may be noted that there will be two rotary hydraulic control valves as described per engine, one each for the intake and for the exhaust valves. Further, each of the sixteen hydraulic valve actuators (one each for each of the intake and exhaust valves on an eight cylinder engine) are single acting pistons which extend by hydraulic pressure and force the opening of the corresponding engine valve the proper distance. These same pistons are forced to retract by means of the associated valve spring when hydraulic pressure is removed.

Each of these pistons may be in one of three states as regards its connection to the hydraulic supply 63 or drain 59. It may be connected only to the hydraulic supply in a suitable position of the rotor 52 and corresponding supply sleeve 51 in which instance it will be fully extended. As the rotor 52 turns, this same actuator will be cut off both from the hydraulic supply and from the drain, in which instance it will continue to be extended for a time depending upon leakage in the drain section of the rotary valve, this time being normally much longer than the time for two engine revolutions at idle speed. Hence, it may be regarded as holding its extended position until intentionally drained. As the rotor turns still further, the drain sleeve 50 will provide an exit passage for the hydraulic fluid for this same valve and the force of the valve spring will cause the actuator piston to retract and pump the hydraulic fluid out the drain end 59 of the rotor. Each such actuator is then simultaneously connected to an exit hole 58 and a corresponding inlet hole 69 on the valve body. There is a fourth theoretical possibility of a particular actuator being connected to both supply and drain simultaneously to cause a hydraulic short circuit. The valve timing normally used on a four stroke internal combustion engine allows for a generous interval between the closing of the drain and the next opening of the supply for any valve actuator, and accordingly, this fourth possibility is not a practical problem.

The principal feature of the rotary hydraulic control valve is the independent controllability of the opening and of the closing programs of engine intake and exhaust valves, this being accomplished by two worms 56 and 57 which engage matching threads 68 in the supply and drain timing sleeves 50 and 51. These worms need be actuated only occasionally and remain fixed when the engine is run at constant power and constant speed. They need be turned only over a relatively small angle and at relatively low speed when they are actuated to effect a particular control of the engine. Control of these worms, which are four in number (two each for the intake and exhaust rotary control valves), therefore requires little power, and control may be effected manually or automatically. These worms are also in an area devoid of hydraulic pressure so that external leakage of hydraulic fluid is readily controlled by well known O-rings seals.

Figure 10:
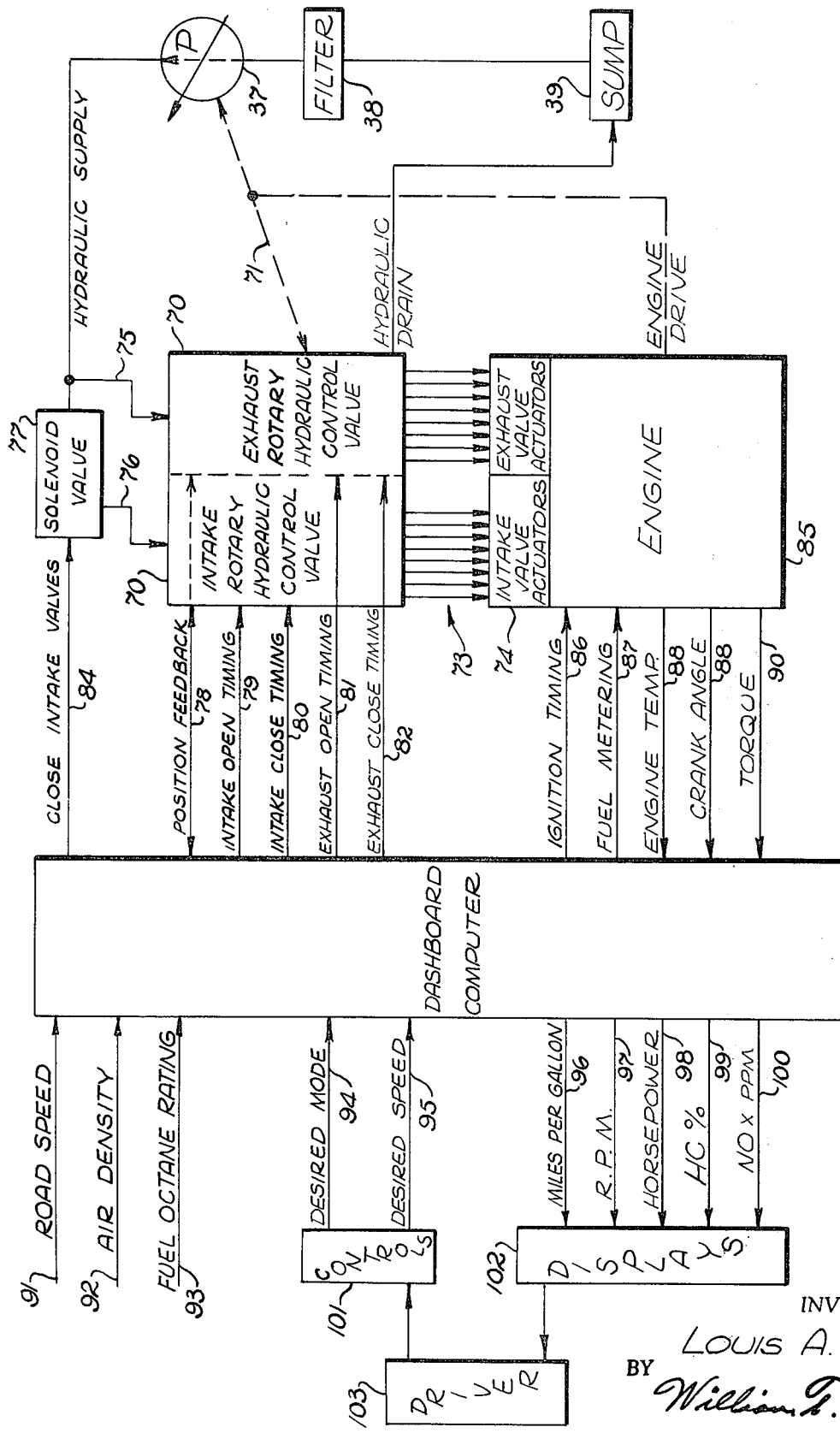
FIG. 10 is a block diagram of an internal combustion engine equipped with rotary hydraulic control valves of FIG. 9, single-acting valve actuators for the individual intake and exhaust valves, a computer and a supply of hydraulic power.

The manner in which a pair of rotary hydraulic control valves would be incorporated into an internal combustion engine is shown in the block diagram of FIG. 10. Such an engine would not have the conventional camshaft, push rods or rocker arms to actuate the intake and exhaust valves, but in their place there would be a rotary valve assembly 70 having both intake and exhaust rotaries, mounted above the centerline (of a V-8 engine) and driven from the crankshaft below with a two-to-one speed reduction. This drive could be accomplished by gearing, chain or by a toothed fiberglass re-enforced belt (see 71). The crankshaft would also drive the usual fuel and oil pumps as well as the variable displacement pump 37 for the hydraulic supply.

Emanating from the rotary valve assembly 70 there would be 16 hydraulic hoses 73, one each for the 16 thimble-sized valve actuators 74, which are mounted directly above their respective engine valves. The exhaust rotary hydraulic inlet 75 is connected directly to the hydraulic supply 37, whereas the intake rotary hydraulic inlet 76 can be interrupted by a solenoid controlled valve 77 so as to allow the closing of all engine intake valves as is desirable during the deceleration mode.

Control signals from the engine computer 83 control the four worms on the rotary valve assembly. These functions and controls are, respectively, intake valve open timing 79, intake valve close timing 80, exhaust valve open timing 81 and exhaust valve close timing 8. The actual worm (and hence drain and supply sleeve) positions are relayed to the computer by position feedback signals 78. A further valve control signal 84 allows the closing of all intake valves while the engine 85 is running.

The computer 83 further controls the ignition timing 86 including the controlled application of ignition to the proper cylinders to start a stalled engine. The computer 83 also computes the proper amount of fuel to be delivered to premix chambers in the vicinity of each intake valve and provides a signal 87 for control of the fuel metering devices in a manner such that the amount of fuel delivered per four stroke cycle is equal to the computed mass of air drawn into the engine the previous cycle, times the desired fuel to air mixture ratio. This mode of fuel metering provides a uniform and every-ready mixture ratio at all speeds and in the transient phases of acceleration and deceleration. The computer 83 derives the information it needs for proper engine control partly from the driver (see 103), partly from the engine itself 85 and partly elsewhere, as for example, road speed 91, air density 92 and fuel octane rating 93. The driver 103, prescribes the mode in which the engine is to operate (see 94), and one or more other variables such as torque or speed (see 95).

The principal data from the engine 85 that the computer requires are engine temperature 88 (for computing spark advance, and the onset of detonation and the production of nitrogen oxides), engine crank angle 89 for timing and for starting, and engine torque to compute brake horsepower, and means effective chamber pressure, the latter being also useful in the prediction of the onset of detonation and of excessive nitrogen oxides production.

With the configuration just described and depicted in block diagram form in FIG. 10, the versatility, efficiency, cleanness and performance of an internal combustion engine can be remarkably improved. These various improvements and the manner in which they are obtained will be described one by one.

Improved Valve Timing. The intake and exhaust valves of an ordinary internal combustion engine are invariably programmed to open and close so as to provide maximum horsepower at some upper speed with the result the engine torque and efficiency suffers at low speeds. In the present invention no such compromise in performance is necessary and the engine may not only produce higher torque at low speeds, idle at lower speeds, and accelerate more readily because of improved low speed torque, but it may also be made more efficient at the highest speeds where performance in an ordinary internal combustion engine is seriously degraded by false valve motion caused by the inertia and flexure of the overall valve gear. This same false valve motion is further aggravated by the mechanical resonance of the valve gear. The inertia of the hydraulic valve control system here disclosed is substantially less than that of conventional valve gear and the speed of intake and exhaust valve opening and closing is essentially constant and not dependent on the speed of a camshaft as in a conventional engine. Further, should resonance effects arise, they may be damped by hydraulic cushioning in the valve actuators and any false valve motion may be anticipated by the computer and taken into account in the computing valve timing.

Charge Control. An important feature of electronic valve control according to the present invention, is the replacement of the intake manifold vacuum as a means of controlling the density and hence the quantity of charge admitted into each cylinder of the engine, intake valve timing being the basic means of charge control. A delayed closing of the intake valves with respect to some setting which gives maximum volumetric efficiency for a particular speed, may be used in lieu of a throttle and intake manifold vacuum control to adjust the charge admitted to each cylinder of the engine. Delayed closing is preferable to early closing of the intake valves as a means of reducing the charge, since no vacuum is created in the cylinder thereby and there is none of the usual tendency for engine oil to seep past the piston rings. The means of charge control described has many advantages. The engine is never required to pump against an intake vacuum, which consumes about one horsepower in a 300 cubic inch displacement engine at idle. With this unnecessary load removed, the engine will idle better and at lower speeds. Further, since intake manifold pressure (or vacuum) is essentially constant, as compared to the typical factor of three variation in a conventional internal combustion engine, it is possible to control the mixture ratio even during acceleration and deceleration since changes in vacuum with consequent uncontrolled precipitation or evaporation of fuel does not occur to produce incorrect mixture ratios so prevalent in prior art arrangements.

Self Start. With cylinders charged with a proper mixture ratio, as is readily effected in controlled stalling of the engine, the computer may restart the engine by delivering ignition to the cylinders whose pistons are in a position to crank the engine in the proper direction (i.e., the appropriate next-to-fire cylinders). Then, as engine speed increases, the computer can smoothly revert to conventional timing, including appropriate spark advance as the engine accelerates. To prepare an engine for computer starting, just prior to stalling the engine ignition is disabled, thereby trapping a combustible charge in the appropriate cylinders. If the engine cylinders must be charged while the engine is stalled, this is still possible by flushing a fresh fuel-air mixture through the cylinders in the following manner. First the supply sleeves on both the intake and the exhaust rotary would be advanced in such a way, that with hydraulic pressure applied, both intake and exhaust valves of the next two or three cylinders in the firing sequence would be successively flushed with a fuel air mixture. When the two supply rotaries have been returned to their normal position, the intake and exhaust valves of these same cylinders will be closed and the trapped charges are then ready for ignition. In advancing the supply sleeves to both rotaries, the drain sleeves must also be actuated in a manner to prevent a hydraulic short circuit.

Positive Deceleration. Engine and vehicle braking by operating the engine as a "four stroke" air compressor is achieved by advancing both supply and drain sleeves on the exhaust rotary control valve by 90°, while the engine is running, the intake valves in the meantime being closed by actuation of solenoid valve 77. This form of braking may be expected to produce 0.1 g. deceleration in high gear for a conventional vehicle so that it will not accelerate going down a 10% grade. Even higher deceleration would obviously be obtained in lower gears. This mode of braking provides a back-up for conventional brakes should they fade due to overheating or wetting. The amount of braking obtained by pumping in this manner is also continuously controllable. In this air compressor mode, gases are taken from the exhaust manifold, compressed and released back into the exhaust, the heat of the compressed gas being carried away by the engine cooling system.

Exhaust recirculation. Exhaust recirculation as a means of reducing the production of nitrogen oxides can be effected by early closing of the exhaust valves (that is, by advancing the drain sleeve on the exhaust rotary valve.) In this way some of the inert gases are retained from mixture with the next charge, the effect of the diluted mixture being to reduce peak engine combustion temperature below the level at which excessive, nitrogen oxides are produced. The timing of the closing of the exhaust valve is continuously variable to properly accommodate the variety of conditions contributing to high combustion temperatures, thereby to reduce nitrogen oxides from a typical 3000 ppm to below 300 ppm, accompanied by minimum of loss of performance or economy in a particular operating condition.

Engine Reversal. To reverse the engine the two exhaust rotary sleeves, supply and drain are retarded by 180° (360° of crank angle). At the same time both supply and drain sleeves on the inlet rotary must be advanced 180°. In engine reversal the firing sequence is also reversed, in contrast to the situation during operation of the engine to apply a torque (while running in the forward direction) opposed to the direction of rotation. For reverse torque operation, both ignition and exhaust valve timing are advanced 360° crankshaft.

Modes of Road Operation. With computer valve control the automobile engine may readily be operated in a number of desirable modes which are not available in a conventional internal combustion engine. A high performance mode would run the engine at reduced torque and higher speed, retaining the capability to quickly increase torque to the maximum for a burst of acceleration. In this mode, a high compression ratio and high combustion temperatures without regard to formation of nitrogen oxides would be allowed.

For maximum economy operation, the engine would be operated at lower speeds but at higher torque for the same brake horsepower output, the increased efficiency arising from the increased ratio of engine torque to friction torque. Since an engine in this mode would be constantly at high combustion temperature (the quantity of charge would be near maximum), the production of nitrogen oxides would not be minimized as in the aforementioned exhaust recirculation mode. Also, it will be noted that minimized nitrogen oxide emission so important in urban areas, may not be necessary in marine applications or in open country driving. Increased horsepower in this mode is possible only by downshifting to obtain increased engine speed since maximum torque is a continuous feature of this mode.

In a low emission mode, an engine would employ exhaust recirculation (or more precisely an increased residual fraction of exhaust gases would be retained from the previous cycle) to reduce peak combustion temperatures. This mode may ultimately be mandatory in city driving.

Other engine modes that may be invoked are, a speed mode where the engine is operated to produce a vehicle speed responsive to the accelerator position with acceleration or deceleration proportional to the difference between the desired (as commanded by an accelerator control) and the actual speed. In this mode, the engine employs, in sequence, the following program to produce deceleration: delaying of the closing of the intake valves, the continuous closure of all intake valves, and operation of the exhaust valves in the compressor mode. For acceleration the sequence would be reversed. For a constant torque from the engine, the charge to each cylinder is kept essentially constant independent of speed, and for constant torque to the rear wheels allowance is made for the effect of the transmission on the engine-to-rear-axle speed ratio.

Inherent Performance with respect to vehicle pollutant emissions. The electronically controllable engine system here disclosed will provide favorable performance with respect to undesirable exhaust emissions.

Evaporative emissions are reduced by virtue of the fact that a conventional carburetor (which must always be vented) is not used. The emission of HC and CO, due to incomplete combustion, is reduced by the computer controlled mixture ratio that can be maintained even during acceleration and deceleration by virtue of the fact that the intake manifold pressures is relatively constant. Emission of hydrocarbons due to misfiring during deceleration is avoided by closing of intake valves during this phase. Misfiring during start and idle, which causes hydrocarbon emissions, is minimized since there is no intake vacuum to draw exhaust gases from the exhaust manifold during the time of valve overlap (a common modern engine design expedient), and thereby dilute the mixture to a point where it will not burn. Hydrocarbon emissions due to maldistribution of the fuel is avoided by providing a separate fuel injector for each premix chamber. Further in this vein, closure of the intake valves during deceleration prevents an unburned mixture from entering the exhaust manifold where it would very likely explode and possibly damage an exhaust manifold air injection pump used to burn residual HC and CO. In any case, the need for elaborate protective devices for the pump is avoided. A significant reduction of all emissions occurs when the engine is operated to simulate an electrically driven vehicle. In that mode, the engine stops when the vehicle stops, reducing noise, air pollution, saving fuel, and reducing the danger of engine over-heating while idling.

Since an engine employing the present valve programming invention has excellent torque at low speeds, it will accelerate more rapidly after computer starting than a conventional engine accelerating from idle. Accordingly, idling of the engine while the vehicle is standing is unnecessary. Even the operation of accessories, such as an air conditioner, may be discontinued during short standing periods with little inconvenience.

In respect to air pollution, the recirculation of crankcase blowby into the intake air manifold is rendered particularly convenient when the present invention is employed, since there is no intake manifold vacuum. Moreover, there is no adverse effect in such recirculation during start or idle and the normally required PCV valve, which is a check valve in effect, is eliminated along with its required maintainence.

Mechanization of the Computer. The state of the art of computer technology offers a wide choice of mechanizations potenially capable of providing the desired engine control with the necessary speed and precision and at a reasonable cost. If one of the engine-driven hydraulic valve concepts is used, the computer need only provide relative timing information and for this purpose an analog type computer employing position servos to adjust the mechanical advance or delay in timing a particular function would be satisfactory. If, on the other hand, solenoid operated hydraulic valves, such as the one shown in FIG. 2, are used, the computer would require information on the position of the crankshaft from which it would have to create the timing sequence for each of the functions to be controlled. For this purpose one might employ a small general purpose digital computer and a suitable computer program to compute the timing and other signals from the input data. A particularly apt computer for controlling solenoid operated valves is one employing ring counters for the position of the crankshaft. A variable delay or advance may then be added to the respective counters to produce appropriate timing signals.

Figure 11:
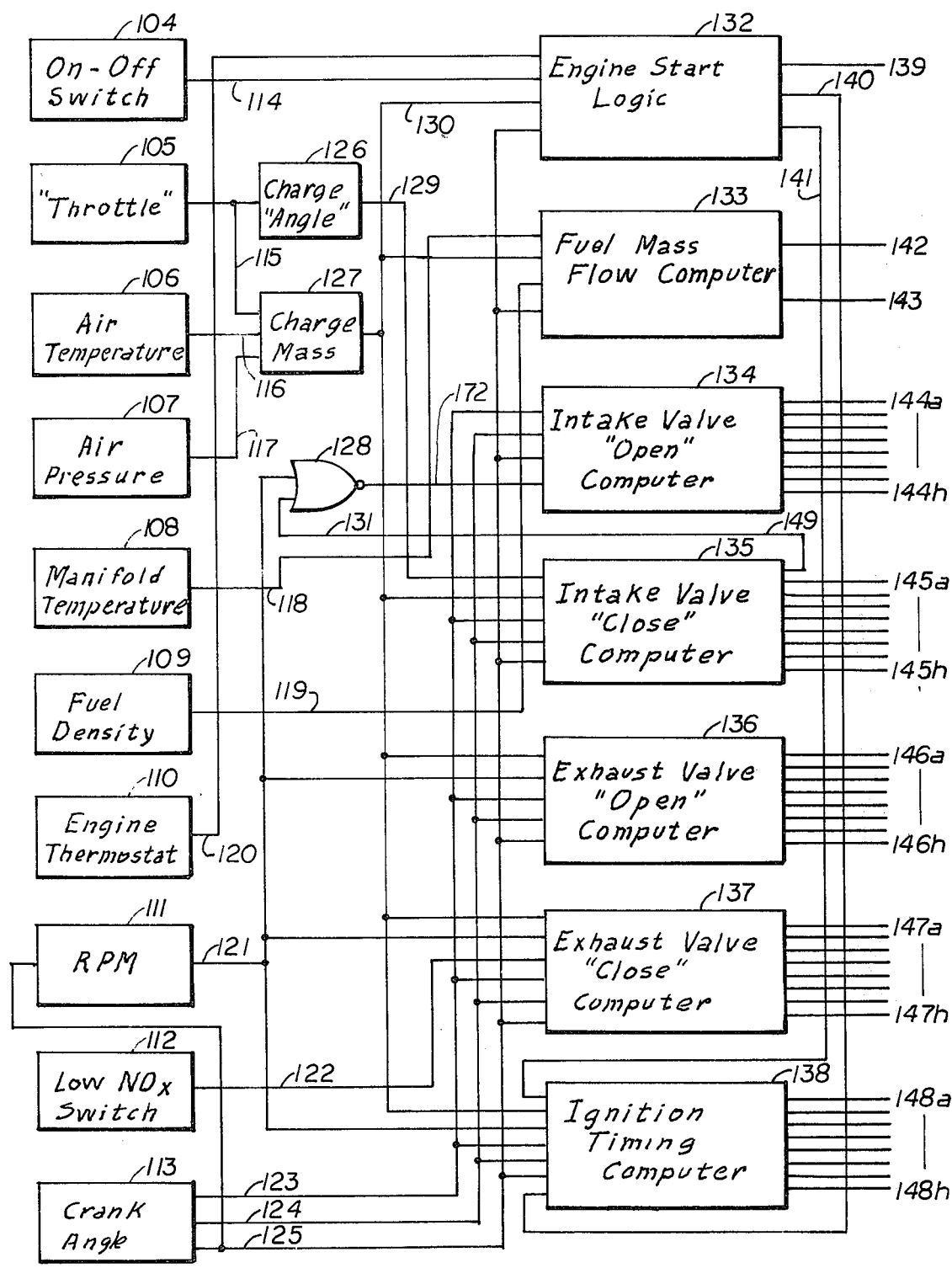
FIG. 11 is a block diagram of the engine control computer.

In FIG. 11 is shown a block diagram of the dashboard computer 83 in a mechanization which employs an optical disk for transmitting crank angle in conjuction with counting circuits to produce timing signals for solenoid controlled hydraulic valve actuators. The required commands or outputs to be produced by the computer for the full control of an eight cylinder internal combustion engine are shown to the right. They are in turn: a signal 139 to actuate the starter solenoid for cranking the engine, proportional signals 142 and 143 for the volumetric flow control of a liquid fuel and a gaseous fuel pump or metering device respectively, signals 144$a$ to 144$h$ to the eight solenoid inlet valves for the engine intake valve hydraulic actuators, signals 145$a$ to 145$h$ to the eight solenoid outlet valves for the engine intake valve hydraulic actuators, signals 146$a$ to 146$h$ and 147$a$ to 147$h$ to the solenoid valves for the engine exhaust valve actuators, and signals 148$a$ to 148$h$ to eight ignition outputs. This is the extent of the engine control signals that the computer is to provide.

The data inputs required by the computer to produce the above control signals are shown to the left in FIG. 11. Signal 114 from switch 104 applies electrical power to the computer and resets the engine starting logic. Signal 115 from the equivalent to the conventional throttle 105 may be provided either by the operator or by a control system such as an automatic transmission or vehicular automatic speed control; signal 115 is essentially a torque command in the embodiment here described. Command signal 115, when positive, serves also to initiate starting of the engine if it is stalled. The inlet air temperature signal 116, obtained from transducer 106, and absolute atmospheric pressure 117, obtained from transducer 107 are required for the computation of air density by the fuel mass flow computer 133. Crank angle, which may be obtained by a variety of transducers is, in the embodiment being described, obtained by counting electrical pulses 125 from the electro-optical disk 113. In the description that follows, these pulses are assumed to occur at a rate of 128 per crankshaft revolution but the principles involved apply to any rate which provides sufficient angular resolution. At every second revolution of the crankshaft a reference pulse 123 resets to zero or loads precomputed timing values into the ring counters which are used for the timing of the engine valves and ignition. Alternatively one may employ a reference pulse once per crankshaft revolution and skip alternate pulses by counting down in a single stage flip-flop, since, without a camshaft, it is not necessary to distinguish between the beginning of the exhaust stroke and the beginning of the compression stroke for bottom dead center of cylinder number one (or any other equivalent reference angles), provided the timing of intake, exhaust and ignition follows the same fixed sequence. A second reference pulse 124, spaced one revolution from reference pulse 123, is used to initiate the precomputation of timing delay or advance of various functions as required.

Four other computer inputs are required from the engine for starting and for fuel metering. They are the engine cylinder wall temperature signal 120, obtained from engine thermostat 110, used to determine whether a hot start using only the computer should be attempted; the intake manifold temperature 118 from sensor 108, used to proportion the ratio of liquid to gaseous fuel during cold start and warm-up; and various engine RPM signals 121. Engine RPM is used for ignition advance and for the proper stopping and restarting of the engine. Engine RPM is determined by circuit 111 which counts crank angle pulses 125 from transducer 113 for various fixed periods of time. Signal 122 from the operator controlled switch 112 provides the option of regulating the retention of a quantity of exhaust gases to mix with the next charge as a means of reducing the emission of nitrous oxides to an acceptable level. The fuel density signal 119, which would be principally a function of the fuel temperature, may be essentially provided by the inlet air temperature signal 116 and the variation in fuel density due to composition provided by the manual setting 109.

The dashboard computer 83, presented in block diagram form in FIG. 11, consists of seven counter type computers operating in parallel for the following functions: the engine start logic 132; a fuel mass flow rate computer 133; four intake and exhaust valve open and close computers 134 to 137; and an ignition timing computer 138. Some communication is required between the seven functional computers as well: the charge angle signal 129, required to compute fuel-air charge mass, is obtained from the analog-to-digital converter 126. It is also required by the intake-valve-close computer 135 which regulates the mass of fuel-air charge supplied to any engine cylinder. The charge mass signal 130 is supplied to all but the intake-valve-open computer 134. The OR gate 128 combines the charge volume signal 149 and the RPM signal 121 to produce signal 172 which under certain conditions inhibits intake valve opening by computer 134. An ignition enable signal 140 and an over-riding ignition fire signal 141 are provided to the ignition timing computer 138 by the engine start logic circuitry 132.

The operation of the computer as a whole is best described by considering each function separately. Five of the functional computers, using commonly available integrated circuit components, employ a typical timing circuit shown in in FIG. 12. Each such timing circuit provides eight signals, one for each cylinder of an eight cylinder engine, at the proper time for the appropriate function, analogous to the operation of a camshaft in a conventional engine. The timing of a particular function (such as intake valve opening) for all eight cylinders is performed ensemble by a single ring counter, shown generically as 157. Since the embodiment being described is assumed to be comprised of commercially available digital circuit building blocks, the eight bit ring counter 157 is shown as two cascaded four bit binary counters 160 and 161 which, when mass produced, would be replaced by a single chip eight bit or possibly ten bit binary counter. The ring counter 157 is loaded with a binary number representing the desired delay or advance either in the afore-mentioned units of 128 angular increments per revolution or some other suitable unit. The counter 157 is loaded once every second crankshaft revolution by the load command signal 123 derived from transducer 113. The desired delay or advance to be loaded is computed and stored in another eight bit binary counter 156 consisting of two cascaded four bit binary counters 158 and 159. The configuration and associated logic of the delay-advance counter 156 depends on the particular function being mechanized and are illustrated for each function separately in FIGS. 13 to 17. The ring counter 157 and associated logical circuitry shown in FIG. 12 are much the same for all functions except that intake valve opening and ignition may each be inhibited by the application of a high signal, signal 140 for ignition and signal 172 for intake valve opening. An over-riding ignition fire signal 141 may also be applied to OR gate 167 to start a stalled engine without the use of an electric starter. OR gate 167, in the present embodiment, is used only in the ignition timing computer 138.

Referring to FIG. 12, three timing signals, 123, 124 and 125, are obtained from a single optical disc 113 employing light emitting diodes 149a to 149c whose light is interrupted by apertures in disk 113 and detected by phototransistors 150 to 152. The output of phototransistor 150 is amplified and shaped by amplifier 154 to produce signal 125, a pulse train having 128 pulse per crankshaft revolution. In the embodiment here described, disk 113 rotates at one-half the crankshaft speed and would therefore be provided with 256 apertures in its periphery to produce signal 125. Phototransistor 152 and associated amplifier 155 provide a load command 123 every second crankshaft revolution. Signal 123 causes the ring counters assoicated with the separate timing functions to be loaded with binary numbers precomputed and stored in the associated delay-advance computers 156a to 156e. Phototransistor 151 and associated amplifier 153 provide a precompute command signal 124 every second revolution of the crankshaft but displaced one full revolution from signal 123. Thus, in the embodiment being described, one full crankshaft revolution is allowed for the precomputation of the proper delay or advance of the timing of a particular engine function, though the desired timing may be computed and loaded more frequently if desired.

The ring counter 157 in FIG. 12 must, for an eight cylinder engine, supply a timing signal every 90° of crankshaft rotation or, since in this example eight-bit counters counting up to 256 in two crankshaft revolutions are used, a timing signal 166 (or 170) must be supplied at every 32nd pulse from signal 125. This timing signal 166 is produced by NAND gate 165 operating on the five low-order bits 164(a) to 164(e) of ring counter shown generically as 157. Regardless of the size of the binary number or word used to represent crank angle, the three highest order bits in counter 157, here represented as 164(f) to 164(h), will count up to eight in two crankshaft revolutions and thus conveniently provide a selector signal to select a particular cylinder in the appropriate firing order, for the application of a particular timing signal. As to NAND gate 165, it will produce a high signal at its output when the low order bits (that is all but the three high order bits, whatever their number) are low or zero, that is, at a count of 0, 32, 64, 96, 128, 160, 192 and 224. In the intake-valve-open computer 134 NAND gate 165 accepts an additional input 172 to inhibit intake valve opening during positive deceleration and to allow intake valve opening just before stall to admit a fresh fuel-air charge for "computer restart." For this computer restart of a hot engine an over-riding ignition fire command 141 is applied to OR gate 167 in th ignition timing computer 138. In the ignition timing computer 138 also, NAND gate 165 is used to inhibit ignition by command signal 140 during the final phase of deceleration.

The distribution of sets of eight valve or ignition commands to the proper engine cylinder is effected by the 3-to-8 multiplexer 168, a commercially available integrated circuit, which accepts the three high order bits 164(f) to 164(h) of ring counter 157 and energizes with a positive or high signal one and only one of its eight output 169a to 169h. The timing signal 170 from NAND gate 165 (or OR gate 167) is combined with the selector signals 169a ot 169h from multiplexer 168 in eight NAND gates 171a to 171h whose outputs are then employed to actuate intake or exhaust valve opening or closing or to apply spark ignition to the proper cylinder at the proper time. Though there are five sets of such gates, only a typical set is shown in FIG. 12. The firing order indicated by arrow 173 is chronological and the corresponding cylinder number sequence will depend on the cylinder numbering scheme (which varies) and on the design of the particular crankshaft. If no camshaft is used, the engine may be run equally well backward or forward by connecting the computer timing outputs 169f to 169h in one of the two orders shown in the firing table below.

timing advance is also possible which will in general not be a straight line, once it has been established by engine tests, Since, in the embodiment being described, the timing mechanization of intake-valve-open timing assumes that the advance in crank angle position is proportional to RPM, it follows that the timing advance is a fixed duration of time given by $$\text{degrees advance} = 6 \times (T_a) \times (RPM),$$

where $T_a$ is the desired time of advance in seconds and RPM is the number of crankshaft revolutions per minute. As there are 360 angular ° for 128 pulses from signal 125 in the embodiment being described, the number of crank angle pulses that must be counted into the delay-advance computer of FIG. 13 is $$128/360 \times (6) \times (T_a) \times (RPM)$$

| Binary Bit | | | FORWARD | | | | | Reverse | | | |
|---|---|---|---|---|---|---|---|---|---|---|---|
| h | g | f | Ex. open | Ex. close | In open | In close | Igni | Ex open | Ex close | In open | In close | Igni |
| 0 | 0 | 1 | 1 | 7 | 7 | 5 | 3 | 7 | 1 | 1 | 3 | 5 |
| 0 | 1 | 0 | 2 | 8 | 8 | 6 | 4 | 6 | 8 | 8 | 2 | 4 |
| 0 | 1 | 1 | 3 | 1 | 1 | 7 | 5 | 5 | 7 | 7 | 1 | 3 |
| 1 | 0 | 0 | 4 | 2 | 2 | 8 | 6 | 4 | 6 | 6 | 8 | 2 |
| 1 | 0 | 1 | 5 | 3 | 3 | 1 | 7 | 3 | 5 | 5 | 7 | 1 |
| 1 | 1 | 0 | 6 | 4 | 4 | 2 | 8 | 2 | 4 | 4 | 6 | 8 |
| 1 | 1 | 1 | 7 | 5 | 5 | 3 | 1 | 1 | 3 | 3 | 5 | 7 |
| 0 | 0 | 0 | 8 | 6 | 6 | 4 | 2 | 8 | 2 | 2 | 4 | 6 |

The foregoing Table demonstrates that the engine may also be reversed by the addition of a modest amount of computer logic since all that is required is that the three inputs 163(f) to 163(h) to the multiplexer 168 be replaced with their two's complement. Thus a single command to such an order-inverting logical circuit will serve to select the desired direction of the crankshaft and obviate the need for a reverse gear in the transmission of a motor vehicle, for example.

The basic timing circuit shown in FIG. 12 is generic and is used in each of the five functional computers 134 to 138 shown in FIGS. 13 to 17 inclusive. The individual differences between the several timing computers 134 to 138 reside mainly in the mechanization of the delay-advance computers 156a to 156e which will now be described.

The intake-valve-open computer 134 is required to perform two relatively simple tasks: to advance the time of opening of the intake valves as a fixed time interval before top-dead-center as required to effect the maximum volumetric efficiency of the engine at all speeds, and secondly, to prevent the opening of the intake valves in response to command signal 172.

At very low RPM the intake valve opens ideally at top dead center but, as the speed of the engine increases, the inertia of the intake gases would prevent their filling the cylinder fully unless the intake valve is opened early to allow the intake gases time to accelerate. The required time advance will depend on the design of both the intake and the exhaust manifold but in general the required advance in crank angle increases with RPM. The mechanization shown in FIG. 13 provides an angular advance that is proportional to RPM and so provides a two point (or straight line) fit to the optimum timing curve. Mechanization of the ideal or, in terms of RPS, revolutions per second, it is $$128 \times (T_a) \times (RPS).$$

The last expression is the product of the required time advance in seconds and the frequency in hertz of the pulse signal 125 and so the required count is obtained by a counter which counts pulses from signal 125 for $T_a$ seconds.

The counting of the required number of crank angle pulses from signal 125 is effected by binary counter 156a in FIG. 13 which is caused to be reset to zero (that is, all eight bits are set to their low position) by the recompute command signal 124 which also triggers the monostable multivibrator 173 to produce an up-count enable pulse 176, $T_a$ seconds in duration. Up-count enable signal 176, applied to the counter 156a permits the upward count of pulses from signal 125 for $T_a$ seconds or, if desired, for $T_a$ plus $T_h$ seconds to account for the anticipated delay $T_h$ in the actuation of the intake valve hydraulic actuator. Typically $T_h$ will be about 3 milliseconds, and $T_a$ about 0.83 milliseconds.

The desired time interval, $T_a$ plus $T_h$, is obtained by a proper choice of the time constant provided by resistor 175 and capacitor 174 associated with the integrated circuit monostable multivibrator 173. When the time of count is completed, the angular time advance (in binary increments of 128 bits per revolution) is held in the counter 156a until command 123 causes this number to be loaded as an initial value (from which to count up) into the ring counter 157a, described generically as counter 157 and shown in FIG. 12. Since the count in counter 157a begins with an initial positive number, the count is in effect advanced by a corresponding amount with respect to top-dead-center or some other crank angle reference.

The second requirement of the intake-valve-open computer 134 is to inhibit intake valve opening under positive deceleration and for this purpose a high input from signal 172 to NAND gate 165 (shown in FIG. 12) is all that is required. The intake valves are prevented from opening during deceleration to prevent the waste of fuel and the emission of unburned hydrocarbons, and during positive deceleration when deceleration greater than that provided by engine friction is required. In the latter event the intake valves must remain closed so as to allow the exhaust valves to be effectively operated in an "air compressor" mode. The intake valves are allowed to open just before engine stall in any case to admit a fresh fuel air charge into the cylinders for a subsequent computer restart.

In FIG. 13 the signals 162a and 163a represent respectively the low-order and the high-order bits of counter 156a, or the outputs of the two separate cascaded four bit binary counters of which 8-bit counter 156a is comprised.

The intake-valve-close computer 135, shown in FIG. 14, is somewhat more complex since, in addition to providing the proper delay in valve closing required for maximum volumetric efficiency (when that is desired) at any engine speed, the timing of the intake valve closing is used as a means to control the quantity of fuel-air charge admitted to any cylinder and therefore this timing acts much as does the throttle in a conventional internal combustion engine. The intake valves open at the normal time but are made to close as soon as the desired amount of fuel-air charge has been admitted. The advantage of this method of engine control is that no intake manifold vacuum is produced, there is less pumping loss, there is no tendency to pump crankcase oil past piston rings and intake valve-stem guides into the firing chamber and, finally, as the fuel-air mixture is formed at near constant atmospheric pressure, it is much more easily controlled in transient conditions of acceleration and deceleration. An engine controlled by intake-valve-close timing will have less of a tendency to stumble when accelerated or to stall when decelerated than is the case in a conventional throttled engine where the fuel-air mixture cannot be made lean enough on deceleration or rich enough on acceleration to avoid misfiring and the consequent emission of unburned hydrocarbons.

Since the intake valve closing must be delayed for maximum volumetric efficiency somewhat beyond bottom center, the counter 156b, after being loaded by the precompute comman 124, is caused to count down or backwards during the duration of the countdown enable command 181 from monostable multivibrator 179. The monostable multivibrator 179 and its associated components 177 and 178 are analogous in function to the monstable multivibrator 173 and its like components of the intake-valve-open computer 134 described above.

For the purpose of reducing the fuel-air charge to the engine to some value below the maximum, the required angular advance in the closing of the intake valves is obtained from the analog to digital converter 126 (see also FIGS. 11 and 18). This angular advance, signal 129, is a function of the desired volume of charge and is determined by the ratio of engine crank pin radius to piston rod length. It is typically a function as follows (where this ratio is assumed to be one-half):

$$\text{Degrees advance} = 180. - \arccos[0.5 + X - 0.5 \times \sqrt{9. - 4.X - 4.X^2}].$$

where X varies from zero to unity for zero to full charge. Signal 129, called the charge angle, is zero for X equal to unity, and 180° for X equal to zero. The above function, signal 180, is produced directly by function potentiometer 182 (see also FIGS. 11 and 18) and is converted to a parallel binary number 129 by the analog-to-digital converter 126. This binary number, signal 129, is caused to be loaded into the 8-bit counter 156b by the precompute command signal 124. At the same time that counter 156b is loaded, the down-count enable signal 181 from monostable multivibrator 179 will cause the number that was loaded to be reduced by down-counting crank angle pulses from signal 125 to provide a delay in intake valve closing as a function of RPM. Thus the number precomputed in binary counter 162b may be either positive or negative depending on the engine RPM and the desired quanity of charge.

The duration of the down-count signal 181 is determined by the pulse-width as controlled by the time constant of resistor 178 and capacitor 177. The required duration is given by $T_d - T_h$ seconds where $T_d$ is the desired intake valve closing delay (typically about 3 milliseconds) and $T_h$ is the hydraulic actuator delay (also about 3 milliseconds). Since these two times are nearly equal, components 177 to 179 serve no purpose in this instance but would be required if the intake valve timing were not a simple function of engine RPM, the more general case.

The NOR gate 183 combines the fifth and sixth bits (in ascending order) from binary counter 156b to sense when the advance in intake valve closing exceeds 45 binary crank angle increments (or 135° of crankshaft rotation), and produces a signal 149 used to inhibit intake valve opening when the admitted fuel-air charge would be only about 25% of the maximum and when engine RPM exceeds 100 (or some such low value), as indicated in FIG. 11.

Figure 15:
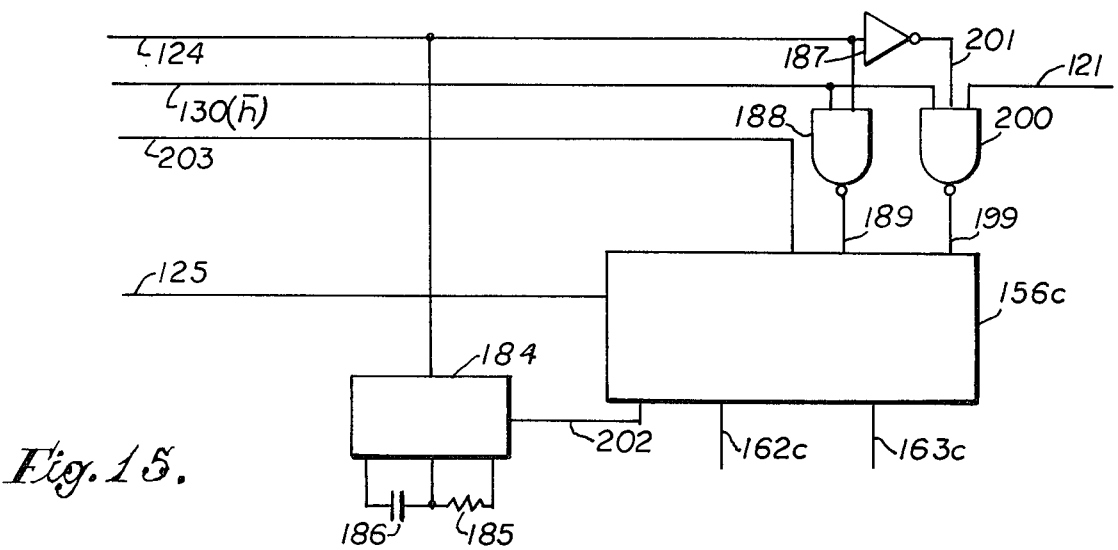
FIG. 15 is a simplified schematic of a timing computer which computes the proper timing advance in the opening of the engine's exhaust valves.

The exhaust-valve-open computer 136 shown in FIG. 15 is similar to the intake-valve-open computer in that an advance in opening time is required with increasing RPM. In this respect the components 184 to 186 inclusive are equivalent in function to similar components 173 to 175 shown in FIG. 13, and produce an up-count enable signal 202 for the counter 156c. The advance in timing is, however, somewhat greater, being typically about 3 milliseconds versus about 0.83 milliseconds for the intake valves. The additional complication on the exhaust valve timing is that these valves are operated in an "air-compressor" mode during positive deceleration (during which time the intake valves remain closed) and operate to draw gases from the exhaust manifold. These gases then undergo two cycles of compression releasing braking energy in the form of heat to the engine cooling system, and are then exhausted during an "expansion stroke". To accomplish this positive deceleration the exhaust valves are not at once shifted in timing to a full "air-compressor" mode, but only proportionately in response to a braking command (for example, from an indicated "negative" position of the "throttle" 105), this braking command, being the then negative binary number 130 from analog-to-digital converter 127. Thus, if the binary number represented by signal 130 is positive, the high order bit 130(h) will be low and its complement 130($\overline{h}$) will be high. The latter signal applied to NAND gate 200 will cause the output 199 of 200 to be high and inhibit the loading of the counter 156c with the complement of the charge-mass signal 130, regardless of the other two inputs to NAND gate 200, namely, signal 201, the complement of the precompute command signal 124 and the signal 121 which is high whenever engine RPM exceeds 100 (or some such low value). Signal 201, the complement of signal 124 is obtained by the inverter amplifier 187. The operation of the exhaust valves in an air compressor mode is inhibited below about 100 RPM when signal 121 is low to allow the exhaust valves (as well as the intake valves) to operate in a normal manner just before engine stall (with ignition disabled) to introduce a fresh fuel-air charge into the engine for a subsequent hot restart by the application of an over-riding ignition fire signal 141 from the engine start logic, shown in FIG. 19.

Since it is desired to advance the timing of both opening and closing of the exhaust valves by as much as 180°, proportional to the then negative valve of the binary number 130, and since to advance the timing a positive number must be loaded into counter 157c (shown only generically as counter 157 in FIG. 12), the complement 203 (which is then positive) of the binary number 130 obtained from the analog-to-digital converter 127, is supplied to the delay-advance counter 156c for loading.

When positive deceleration is not desired, that is, when the binary number 130 is positive, the counter 156c, instead of being loaded, is reset to zero by the precompute command 124 enabled by the complement 130($\bar{h}$) of the high order bit of signal 130 obtained from analog-to-digital converter 129, acting through NAND gate 188 to produce the counter reset signal 189.

Figure 16:
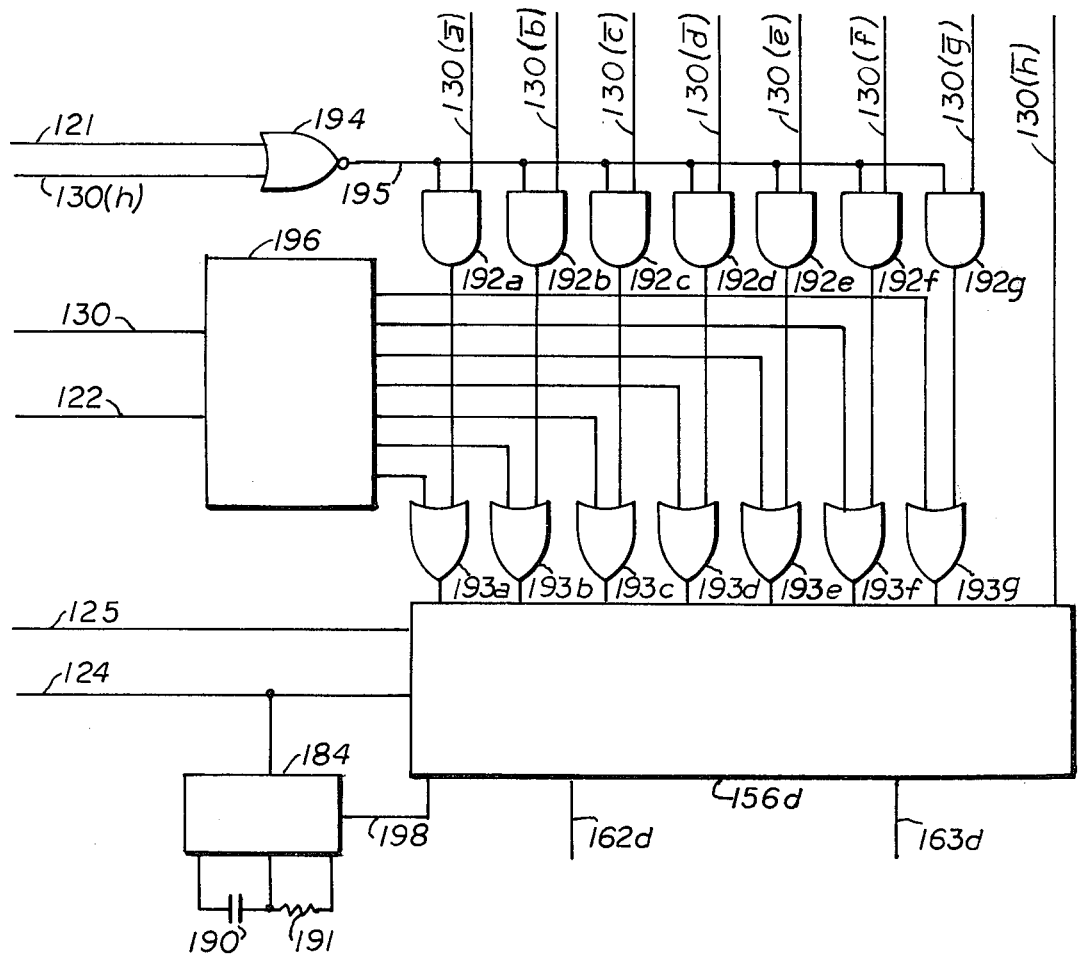
FIG. 16 is a simplified schematic of a timing computer which computes the timing advance or delay in the closing of the exhaust valves.

The exhaust-valve-close computer 137 is shown in detail in FIG. 16. It provides a typical delay as a function of RPM of about 3.7 milliseconds in the closing of the exhaust valves by means of components 184, 190 and 191 which operate in a manner similar to components 177 to 179 in FIG. 14 to produce a down-count enable signal 198 which causes the number in counter 156d to represent a corresponding time delay. The provision for advancing the closing of the exhaust valves to effect positive deceleration is synchronous with that shown in FIG. 15 for the exhaust-valve-open computer 136, except that the mechanization is complicated by a provision for retaining a desired amount of exhaust gases within the cylinders to mix with the next fuel-air charge for the purpose or reducing the formation of nitrous oxides. Thus, for a delay, the binary number 130 must be subtracted from the counters 156d by the addition of its complement represented by the inputs 130($a$) to 130($h$) in FIG. 16, and, for the reduction of nitrous oxides formation, a positive function of the binary number 130, equivalent to mass charge, must be loaded into the same counter. The choice of which number is to be loaded is controlled by AND gates 192a to 192g and OR gates 193a to 193g. The output 195 of NOR gate 194 acts to transfer all but the highest order bit of the complement of the binary number 130 into the seven OR gates 193a to 193g when positive deceleration is desired; otherwise the number zero is transferred. When zero is loaded into the OR gates 193a to 193g, the exhaust valves will close normally with the delay provided by components 184, 190 and 191 producing the downcount enable signal 198; however, the OR gates 193a to 193g have a second input provided by a function generator 195 which provides an advance in the closing of the exhaust valves as some function of fuel-air charge when low nitrous oxides formation is desired. If the charge mass (per cylinder) is less than some such valve as 75% of maximum (that is, binary number 130 is less than about 48 units on a scale of 64 for maximum charge), the combustion temperature is not likely to be so high as to produce excessive nitrous oxides, but if it is higher, that the amount of exhaust gases that must be retained to limit the peak combustion temperature must increase as the square or some similar function of the amount of charge in excess of 75%. Logic module 196 mechanizes the proper schedule of timing advance versus mass charge 130 and the advance in timing so determined is supplied, when enabled by signal 122, to the OR gates 193a to 193g. Since positive deceleration and a positive mass-charge signal 130 are mutually exclusive, the positive deceleration input 192a to 192g is never supplied simultaneously with the timing advance from module 196 to OR gates 193a to 193g. Input 122 to the logic module (or function generator) 196 is from the operator controlled selector switch 112 (see FIG. 11) which provides the option of either low nitrous oxides emission or higher engine horsepower and efficiency.

Figure 17:
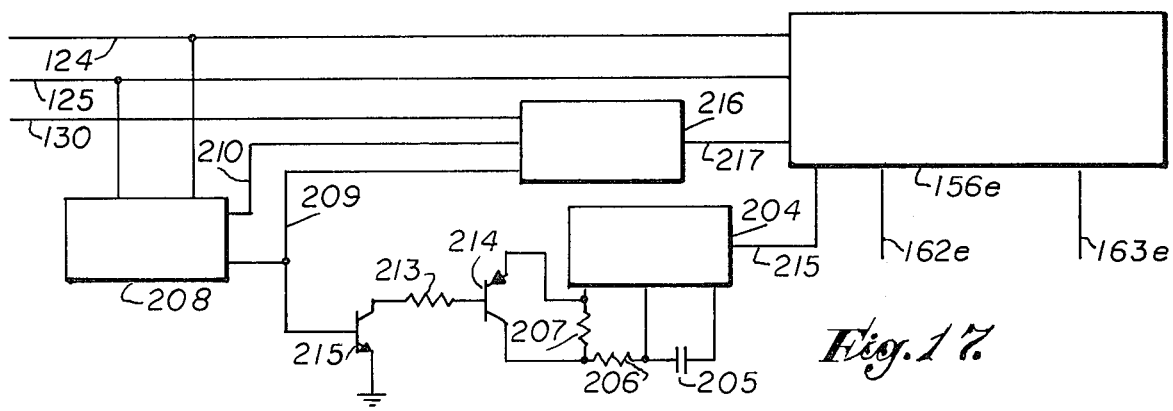
FIG. 17 is a simplified schematic of a timing computer which computes the advance or delay of the ignition timing.

Th ignition timing computer shown in FIG. 17, must provide a delay or advance (relative to top dead center) of the timing of ignition for each cylinder as a function of charge mass and RPM, analogous to the vacuum advance and centrifugal advance of a conventional ignition system. The centrifugal advance is not linear with RPM (as it very nearly was with valve timing), and therefore the desired ignition advance is not a fixed interval of time. It is rather an interval of time equal to the time of pressure buildup between the first application of ignition and when chamber pressure reaches about 75% of maximum, the variation in pressure buildup time being the result of variable flame speed. Due to increased mixture turbulence at higher engine speeds, flame speed tends to increase with engine speed and hence the ignition timing advance in seconds must be reduced as engine speed increases (through, the timing advance in crank angle, being the product of engine speed and the desired advance in seconds, actually increases with engine speed). Thus, what is required for the mechanization of ignition timing advance is a variable time constant controlling the duration of the up-count enable pulse 215 as a function of engine speed. In the mechanization here described this variable time advance is approximated by the use of two "centrifugal" advances, one for low RPM and another for high RPM. Since these advances correspond to the slope of the crank angle versus RPM centrifugal advance timing curve, the resultant curve is comprised of two contiguous straight line segments of different slope, and will closely approximate the typical centrifugal advance timing curve for a typical 300 cubic inch displacement 8-cylinder engine.

Components 204 to 207 in FIG. 17 provide the two "centrifugal" time advance intervals, one for low speed and one for high speed, the changeover speed being about 1000 RPM. Resistor 207 (effectively short-circuited above 1000 RPM) appears in series with resistor 206 to increase the time constant, and therefore the slope of the centrifugal advance versus RPM curve. An RPM discriminator 208 produces a signal 209 which is high above 1000 RPM and low below 1000 RPM. Signal 209, applied to the base of transistor 215 causes transistor 215 to conduct producing thereby a current flow in its collector resistor 213 at higher engine speeds. The current in resistor 213 in turn biases transistor 214 into conduction, in effect placing a short circuit across resistor 207 so that only resistor 206 and capacitor 205 determine the on-time of the monostable multivibrator 204. At low speeds, on the other hand, the signal 209 is low and, as a consequence, the resistance effecting the time duration of the up-count enable pulse 215 from multivibrator 204 is the sum of the resistances of resistors 206 and 207, producing a longer time constant at low speeds as required.

At speeds up to 1000 RPM (or thereabouts) the centrifugal advance is directly proportional to RPM and therefore exactly equal to the fixed interval of time set by the long time constant in multivibrator 204. At the speed where the changeover is made to a short-time constant (that is, where the slope of the degrees advance versus RPM curve is abruptly reduced to a lower value) it is nevertheless required that either mode will produce precisely the same advance. In effect, the centrifugal timing advance above 1000 RPM is a constant crank angle plus a fixed time (crank angle proportional to RPM) equal to the duration of the shorter pulse output of multivibrator 204. Above 1000 RPM, therefore one must initially load the counter 156e with the required fixed angle and add to it (by counting pulses from signal 125 during the time that the counter is enabled by signal 215) the time duration of signal 215 from multivibrator 204. In order that the counter 156e may be loaded with the desired constant crank angle (above 1000 RPM only), the complement 210 of signal 209 is supplied to the logic module 216.

Function generator 216 produces a four bit binary signal 217 (corresponding to a maximum crank angle of 45°) which provides the equivalent of the conventional vacuum advance and it is here conveniently employed to also supply the time constant required to match the two centrifugal advance curves at the transition speed. Function generator 216 produces an initial value 217 to be loaded into counter 156e by the precompute command 124. The four low order bits of signal 217 are given by the following Boolean equations.

$$A = f \times (\bar{e} \times d + \bar{d} \times c)$$

$$B = \overline{d \times \bar{e} \times f}$$

$$C = \bar{r} \times e \times f + r \times \bar{e} \times \bar{f}$$

$$D = \bar{r} \times e \times f$$

where $r$ is signal 209, $\bar{r}$ is signal 210 and $d$, $e$, and $f$ are the fourth, fifth and sixth order bits of the mass charge signal 130. The mass charge signal 130 is fully the equivalent of the intake manifold vacuum used to control vacuum advance in a conventional engine. As the charge mass is increased the ignition must be progressively retarded to avoid detonation with a fuel of a given octane rating.

The mechanization of centrifugal and vacuum advance described in the foregoing is based on the timing curves of a typical 300 cubic inch displacement eight cylinder internal combustion engine adjusted for approximately 90 octane gasoline. It is obvious to those skilled in the art that the above equations and their mechanization would have to be modified to accommodate specific engine designs, compression ratios, and other grades of gasoline, and that with additional logic and an input datum for fuel octane, logic module or function generator 216 may readily be made adaptive to fuel octane, either by direct control by the operator, or automatically by sensing the onset of detonation and backing off the timing advance accordingly.

Figure 18:
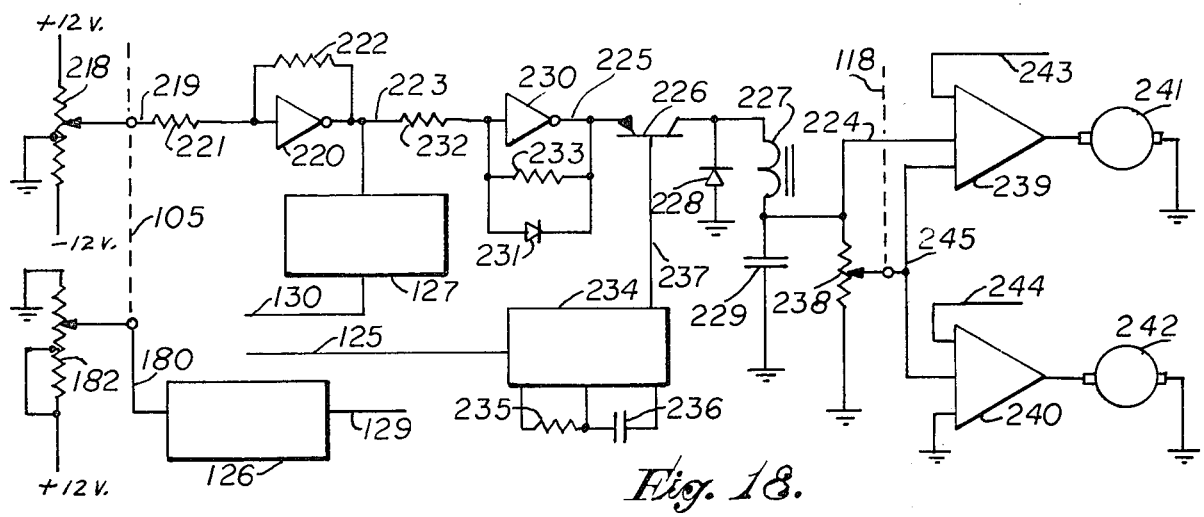
FIG. 18 is a simplified schematic of circuitry which computes the intake valve timing required to produce a desired fuel-air mass charge ratio and volumetric flow rate of fuel.

In the embodiment of the engine computer 83 being described, the control of engine speed or power is effected by the equivalent of a throttle 105, as shown in FIG. 18. This "throttle" 105 regulates the mass of the fuel-air charge admitted to any engine cylinder by means of variable intake valve closing timing. The desired mass charge may itself be computed to meet some requirement in a specific application, as for example, to provide a certain vehicle speed in conjunction with an automatic transmission, or it may be controlled by the operator directly as is the throttle in a conventional engine. The control of fuel-air mass charge in the embodiment being described is by means of a linear potentiometer 218, which provides a voltage 219 proportional to its position and corresponding to the desired volume (not mass) of fuel-aircharge with respect to the maximum possible. The maximum mass charge possible at any time depends on other such factors as air density. The voltage 219 representing charge volume in FIG. 18 is multiplied by the relative (to standard) atmospheric density by means of operational amplifier 220, a resistor 221 proportional to absolute temperature and a resistor 222 proportional to atmospheric pressure. It is well known that the density of a gas like air is proportional to its pressure and inversely proportional to its absolute temperature so that, with resistor 221 as the input resistor and resistor 222 as the feedback resistor of operational amplifier 220, the output 223 of amplifier 220 will correspond to the product of charge volume and charge density; that is, it will correspond to the mass of air introduced into any one cylinder in a single charge while the engine is running. This air mass must be known to determine the required mass of fuel that will produce a correct mixture under all atmospheric conditions. For the resistor 221 to be proportional to the absolute temperature (at average atmospheric temperatures) it must have a positive temperature coefficient of 0.0034, or that of stainless steel. The resistor 222, which must be proportional to atmospheric pressure may be supplied by any of a number of commerically available barometric pressure transducers.

As described in the foregoing, the amount of charge that is to be admitted to any cylinder of the engine is not a linear function of the advance in closing of the intake valves due to the conversion from rotary to reciprocating motion by the crankshaft and piston rod, therefore, a second potentiometer 182, coupled mechanically to potentiometer 218, is provided whose voltage output 180 reflects the correct angle of intake valve closing advance, called the charge angle, at which the volume of intake air corresponds to the voltage output 219 of potentiometer 218, as described in connection with the intake-valve-close computer 135. Analog-to-digital converter 127 converts the voltage 223, representing cylinder charge mass, to a binary number 130 representing charge mass. The analog voltage 223 for charge mass (actually for air mass in the charge or about 93.3% of the charge mass) is used as a principal input to a fuel injection computer which computes the required fuel mass flow rate for a correct mixture. The required fuel mass flow rate is the following product, in appropriate units:

$$\text{Fuel flow rate} = (F_c) \times (C_m) \times 4. \times (\text{RPM}/60),$$

where $F_c$ is the correct mixture ratio (approximately 0.067 for gasoline mass to air mass), $C_m$ is the mass of air admitted to any engine cylinder on the intake stroke, "4." is a number representing four intake strokes per revolution for an eight cylinder engine and RPM, as before, is the engine speed in revolutions per minute. The above product is mechanized by a so-called lossless buck-voltage regulator which has the property that its output voltage is the product of the three following quantities: the input voltage, the pulse frequency of switching in hertz, and the pulse width in seconds. This analog multiplier is comprised of switching transistor 226, an inductor 227, a diode 228 and a capacitor 229. The voltage input to this circuit is the output of operational amplifier 230 which reproduces the air mass signal 223 except, with the diode 231 in the feedback circuit of amplifier 230, the output voltage is zero when the air mass signal 223 is negative. A negative air mass, of course, cannot be realized but the negative value is used to control positive deceleration during which time fuel flow rate must be zero. Resistors 232 and 233 determine the gain of amplifier 230 in its linear range.

The switching transistor 226 conducts once each for each pulse produced by signal 125 whose pulse frequency is proportional to RPM, the pulses being obtained from the mono-stable multivibrator 234 which is driven by said signal 125. The time duration of each pulse produced by the output 237 of 234 is determined by capacitor 236 and resistor 235 associated with multivibrator 234. Thus, in accordance with the above mentioned relationship for the output of the analog multiplier, the output voltage will be the product of the voltage 225 representing the mass of air admitted to any cylinder, the frequency of signal 125 corresponding to RPM, and the width of the pulses 237 from multivibrator 234. The duration of the pulses 237 from the multivibrator 234 can be adjusted manually, if desired, to reflect the density of the fuel which varies both with temperature and composition, and with this adjustment the output of the buck regulator type multiplier will represent the desired volumetric flow rate of either the gaseous or liquid fuel used to power the engine. The variation in fuel density due to temperature may also be accommodated by reducing the temperature coefficient of 221, that is by incorporating the temperature effect on volumetric mixture ratio wholly in the correction for air density, in which event the pulse width of multivibrator 234 would represent only the fuel density variation due to composition. The hydrocarbon composition and hence density of gasoline is adjusted seasonally to provide the best compromise in fuel vapor pressure for easy starting.

The voltage output 224 of the analog multiplier comprised of components 226 to 229 inclusive, is used for feedback control of two fuel metering devices (which may be volumetric or positive displacement pumps), one for liquid fuel and the other for gaseous fuel, the proportion of flow of each being set by a potentiometer 238 whose setting is controlled by the temperature 118 of the intake manifold 108. At intake manifold temperatures below zero degrees Fahrenheit, potentiometer 238 is in its minimum position and the mass proportion of fuel flow would be typically about 90% gaseous and 10% liquid. When the intake manifold temperature reaches about 150 degrees Fahrenheit, potentiometer 238 reaches the upper limit of its range and only liquid fuel is supplied to the engine. Potentiometer 238 is to some extent equivalent to the automatic choke in a conventional engine, though here no choking or enrichment of the fuel-air mixture is effected but rather a near correct fuel-air mixture ratio is maintained even in cold starting and running. The use of gaseous or high vapor pressure fuel for cold starting and running is highly desirable as it prolongs engine life by preventing liquid fuel from displacing engine oil for lubricating the pistons and prevents the emission of a large percentage of unburned fuel, as conventional engines do, when running cold. Once the engine intake manifold is sufficiently heated, the advantages of gaseous fuel (except possibly for octane rating) cease and liquid fuel is entirely satisfactory as well as more economical.

The desired volumetric fuel flow rate signal 224 is therefore separated into two components, the first 245 is proportional to the desired volumetric liquid fuel rate and the difference between signals 224 and 245 is the desired volumetric gaseous fuel flow rate. The liquid fuel flow rate signal 245 drives servo amplifier 240 for the liquid fuel volumetric fuel pump (or metering device) 242 provided with tachometer feedback 244. Similarly, the difference of signals 224 and 245 drives servo amplifier 239 for the volumetric gaseous fuel metering device 241, provided with volumetric flow feedback signal 243.

Figure 19:
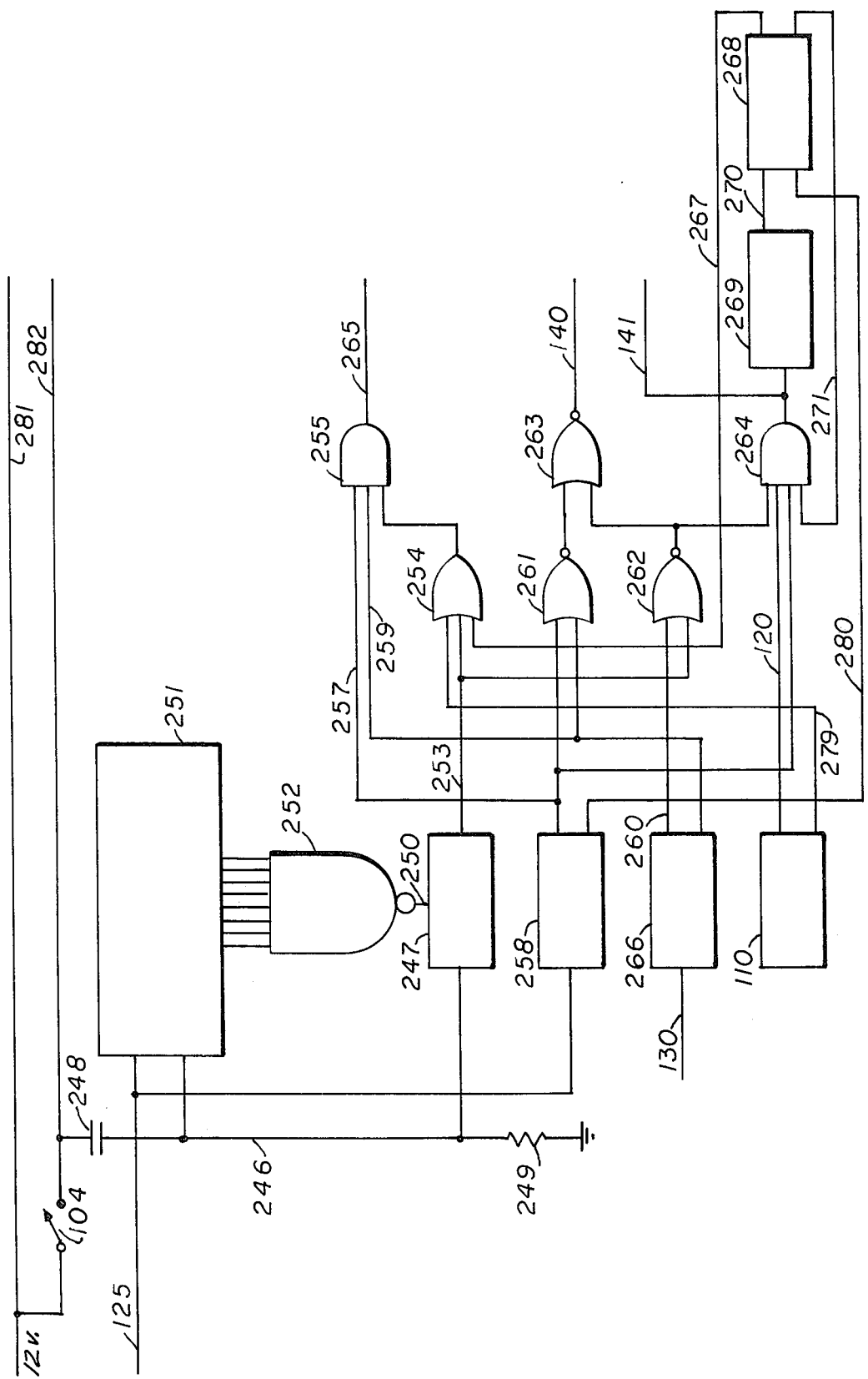
FIG. 19 is a simplified schematic of control logic for starting either a cold or a warm engine.

A block diagram of the engine starting logic circuitry 132 is shown in FIG. 19. A principal input to this logic is the computer on-off switch 104 and the state of readiness 253 of the computer. Whenever the computer is turned off the volatile registers of the counters used in the embodiment being described will no longer reflect the proper position of the crankshaft. This deficiency may be overcome by employing counters with non-volatile memories as is obvious to those skilled in the art, however, the recent development of complementary MOS (metallic oxide silicon) digital circuit logic components which in powdered standby require only about one microwatt of power per logic gate, would make it practical to supply power to the counter registers continuously for the entire computer standby power in this condition would only be about one milliwatt. This standby power would be provided to the critical circuits by the 12 volt DC bus 281 in FIG. 281.

In the embodiment being described the contingency is nevertheless provided for that the respective binary counters do not represent the current crankshaft angle until the engine has been cranked by the electric starter for two full revolutions. When this has been done, the computer is assumed to be in a state of readiness. To determine computer readiness, the application of electrical power to the computer by switch 104 applies a reset pulse 246 to flip flop 247 via the network of capacitor 248 and resistor 249 and causes the computer-ready signal 256 to be low signifying that the computer is not ready. The same pulse 246 which resets flip-flop 247 is applied to reset the 8-bit counter 251 to zero. The eight bit output of counter 251 is applied to NAND gate 252, the output 250 of which will be high only when the output of binary counter 251 is all "ones", which will occur after two revolutions of the crankshaft since counter 251 counts pulses from signal 125 which provides 128 pulses per crankshaft revolution. A high output from NAND gate 252 permanently sets the computer signal 253 to low, signifying that the computer is ready.

When the computer on-off switch 104 is turned on, electrical power is also supplied to bus 282 for the auxiliary electric hydraulic pump (not shown) to provide hydraulic power for the actuation of intake and exhaust valves until this power can be provided by the engine driven hydraulic supply. Power to the auxiliary pump is removed by a pressure switch actuated by the hydraulic supply pressure. Check valves in both the electric and the engine-driven hydraulic supplies prevent reverse flow when either one is not operating.

When the computer is not ready, the output 253 of flip-flop 247 is high and, being applied to OR gate 254, causes the output 256 of 254 to be high. Signal 256, applied to AND gate 255, enables the latter to transmit a start signal 265 to the starter solenoid (not shown). Two other high inputs to AND gate 255 are required to energize the starter solenoid in this condition: signal 257 from the RPM discriminator 258 and the signal 259 from the logic module 266 must both be high as well. Signal 257 is high at low engine speeds (typically below 100 RPM and the RPM discriminator 258 provides this signal by sensing the pulse frequency of signal 125. The logic module 266 acts on the binary number 130 representing throttle position to produce a high signal 259 and its complement 260 when the "throttle" is more than about 75% open, represent-typically an attempt on the part of the operator to start the engine. The starter being energized with the computer in the not-ready state, two revolutions of the engine will produce a low signal 253 from flip-flop 247. For the starter to continue to turn with the computer ready, other conditions must now be met.

Once the computer is ready, the starting logic may act to start the engine by the enabling of ignition. Ignition is applied only if the computer is ready (signal 253 is low) and the throttle is above 75% open (signal 259 is high) regardless of engine speed, or if the throttle is not sufficiently open (signal 259 low) only for engine speeds above 100 RPM (signal 257 low). This logic is mechanized by NOR gates 261 and 262 acting on signals 253, 257, 259 and 260, and by NOR gate 263 which produces a signal 140 which, when low, enables ignition in the ignition timing computer 138 as shown in FIG. 12.

If the stalled engine is warm and the computer is ready (signal 253 low) an attempt will be made to start the engine by producing an over-riding ignition fire signal 141 through AND gate 264, as shown in FIG. 19. The conditions that must be met for such an attempt are combined in AND gate 264, namely, a computer ready signal (signal 253 low), an open throttle signal (signal 254 high), a high signal derived from NOR gate 262, an engine temperature high signal 120 from the engine thermostat 110, and a high "not-fail" signal 267 from flip-flop 268. The output of AND gate 264 is the over-riding ignition fire signal 141 supplied to the ignition timing computer 138. One second after application of signal 141, if the engine has failed to start, the one-second delay multivibrator 269 will set the fail-start flip-flop 268 to the fail position setting in motion the logic to energize the starter solenoid with the computer ready by supplying a high signal to OR gate 254.

The one-second delay monostable multivibrator 269 is triggered by the over-riding ignition signal 141 and produces a trigger 270 one second later to set flip-flop 268 into the start-fail condition. The complement 271 of the start-fail signal 267 will then be low and, applied to AND gate 264, will discontinue the application of the over-riding ignition fire command 141. The fail-start flip-flop 268 is reset to the start-not-fail position by signal 280 from the RPM discriminator 258. Signal 280 is high for RPM above 1000 or thereabouts, signifying the successful starting of the engine.

Computer starting of even a stalled cold engine may be mechanized if both gaseous and liquid fuels are provided and if, just prior to engine stall, (during the period that the engine is being charged with a fresh fuel-air mixture with ignition disabled as described previously), the fuel supplied to the engine is switched from liquid to gaseous, which may be effected by open-circuiting the engine thermostat signal 115 during this engine charging period.

Figure 20:
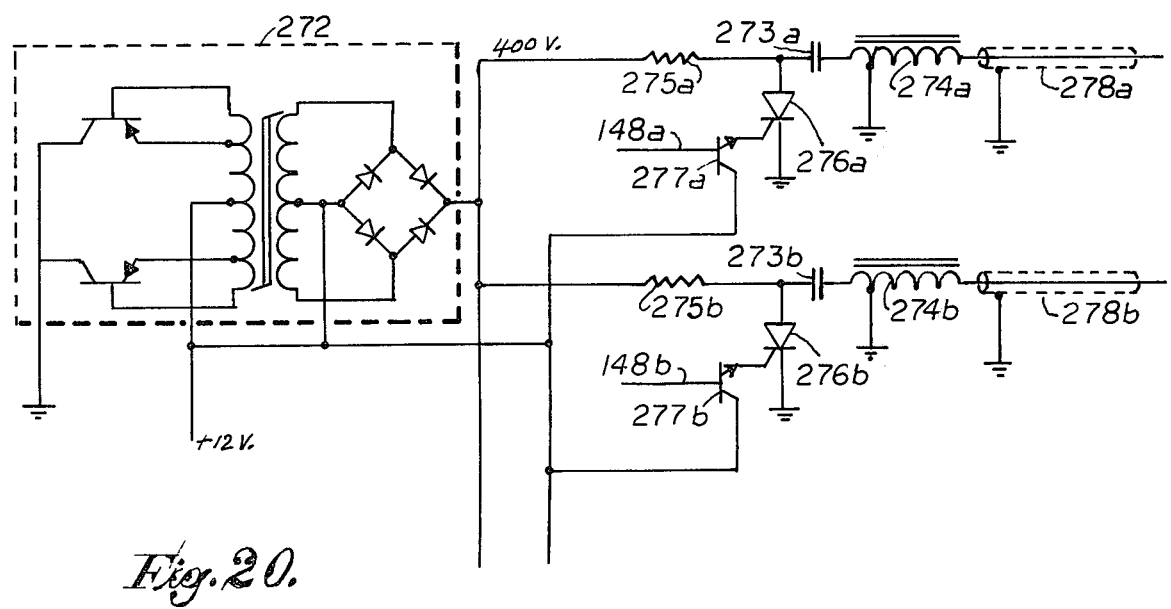
FIG. 20 is a simplified schematic diagram of an ignition and ignition distribution system.

Since high voltage commutation to each spark plug of the electrical ignition pulse is not practical with solid state semiconductor devices, an alternate scheme using a capacitor discharge ignition system with separate miniature pulse transformers for each spark plug is shown in FIG. 20. As the pulse transformers are not used to store the energy for the ignition pulse but only to transmit this energy from a storage capacitor to the respective spark plug, they can be made much smaller than an ordinary ignition coil. A principal limitation on the size of the ignition pulse transformers is the difficulty of insulating the windings for the very high interwinding voltage when the windings themselves are quite small. To provide more reliable insulation the eight ignition pulse transformers 274a to 274h may be sealed in a canister of high dielectric strength insulating oil, the shielded high tension spark-plug wires exiting from this canister rather than from the conventional distributor cap.

Since, in the embodiment being described, there is one energy storage capacitor 274a to 274h for each spark plug, the time allowed for the charging of the respective capacitor is two crankshaft revolutions rather than only one-fourth revolution as in conventional capacitor-discharge ignition systems, and the limiting resistors 275a to 275h can have a correspondingly higher value of resistance, an important consideration which allows the silicon controlled rectifier switches 276a to 276h to be turned off the more readily. As in conventional capacitor-discharge ignition systems a DC-to-DC converter 272 is used to provide a high voltage of about 400 volts DC for the charging of the energy storage capacitors 273a to 273h. Application of an "on" pulse 148a to 148b from the ignition timing computer to the emitter followers 277a to 277h will trigger the respective silicon controlled rectifier switch 276a to 276h and apply the full 400 volts of the respective capacitor 273a to 273h across the primary of the pulse transformer 274a to 274h. If no energy is dissipated in the secondary by the production of a spark, the combination of leakage reactance in the transformer 274a to 274h, the capacitor 273a to 273h and the wiring and spark-plug capacitance in the secondary circuit of the transformer, forming a simple resonant circuit, would cause the current in the primary to reverse after one half cycle of the resonant frequency and so force the silicon controlled rectifier switch 276a to 276h to be turned off. However, if a spark is produced, the reverse current in the primary of transformer 274a to 274h will be substantially less than the initial forward current, perhaps no more than a few amperes. To insure that this lesser current will turn off the 276 respective silicon controlled rectifier switch, it is important that the forward current through the switch from limiting resistor 275a to 275h be as small as possible and therefore that the resistance of resistor 275a to 275h be as high as possible.

Since, in effect, the capacitor 273a to 273h and the stray circuit capacitance in the secondary of transformer 274a to 274h are in series (the secondary circuit capacitance appearing in the primary circuit magnified by the square of the turns ratio of the transformer), a very high resonant frequency would result if the secondary circuit capacitance were too small. A desirable value of secondary circuit capacitance is about 150 picofarads or more, which may be conveniently obtained by the use of shielded ignition wire leads 278a to 278h. The use of shielded wire is also desirable to minimize ignition electrical interference in the computer.

A digital type dashboard computer 83, such as described in the foregoing is only one of many possible embodiments. One may employ a central vehicle computer that oversees the entire operation of the vehicle, the automatic transmission, anti-skid braking, air-conditioning, battery management, engine diagnostics, and automatic response in certain common emergency situations. The greater the scope of information and control relegated to the computer the greater the ease with which it can perform its task as there is nothing that complicates a computer so much as to be required to function adequately with incomplete information. Further, the detailed mechanization may employ counters and gates as described herein, a mechanization that can be contrived a very low cost with commercially available integrated circuit modules, or it may employ an arithmetic unit comprised of shift registers, adders, and multipliers to perform the necessary engine computations serially which, in the embodiment here described are in effect performed by several computers operating in parallel. Further, when produced in quantity, the size and cost of the computer can be greatly reduced by the use of large scale integration of hundreds of logical circuits on one or a few silicon chips. The weight of such an engine computer, exclusive of power devices used to actuate valves, motors or ignition, would be only a few ounces. If complementary MOS circuitry is employed, the computer would have a very high noise immunity, would operate at any supply voltage from three to 18 volts and require a standby power of only a few milliwatts.

The meaning intended herein for the expression engine valves is the ensemble or arrangement of intake and exhaust valves of an internal combustion engine.

Fluid control medium as intended herein, includes compressible and non-compressible fluids such as hydraulic fluid, crankcase oil, air, and combustion products.

I claim:

1. An installation for controlling an internal combustion engine comprising:
   at least one cylinder and piston combination;
   a crank shaft with said piston connected thereto by a connective rod, so that said crank shaft revolves about an axis;
   an inlet valve and an outlet valve for each cylinder;
   a fuel supply means;
   a first means for providing a first signal indicative of the desired output power of said engine;
   second means for detecting the phase angle of said crank shaft and for producing a second signal each time said crank shaft passes a given phase angle;
   third means responsive to said first signal from said first means and also to said second signal from said second means for providing, at a predetermined time and of a predetermined time duration, a third signal for a respective one of said inlet valves;
   fourth means responsive to the second signal from said second means for providing, at a predetermined time, a fourth signal for a respective one of said outlet valves;
   fifth means, in combination with a respective inlet valve and responsive to a respective third signal, for opening said respective inlet valve and keeping said inlet valve open for said predetermined time duration;
   sixth means in combination with a respective outlet valve and responsive to a respective fourth signal for opening said respective outlet valve.

2. The installation of claim 1 wherein:
   the timing of said third signal is related to the phase angle of said crank shaft so that said respective inlet valve opens substantially near the top dead center of the respective piston;
   the predetermined time duration of said third signal is related to said first signal so that the open time duration of said respective intake valves increases as the power demand increases as indicated by said first signal.

3. The installation of claim 2 wherein said second means further includes:
   frequency means for producing a pulsating current wherein a fixed number of cycles therein represents one revolution of said crank shaft;
   a frequency counter responsive to said second signal and to said frequency outputted from said frequency means for counting each cycle of said pulsating current, and for producing numbered signals representing the number of said cycles which have elapsed after said given crank shaft phase angle;
   first logic means, responsive to said numbered signals of said frequency counter and in combination with said third means, for detecting when a predetermined number of cycles has been counted by said counter and then producing said third signal;
   second logic means, responsive to said numbered signals of said counter and in combination with said fourth means, for determining when another predetermined number of cycles has been counted by said counter and then producing said fourth signal; and
   said second logic means has means for holding said fourth signal until at least one-half of the number of cycles for one crank shaft revolution has elapsed so that said exhaust valve is open at another predetermined position of said crank shaft and remains open for at least one-half a revolution of said crank shaft.

4. The installation of claim 3 wherein there is provided:
   third logic means to detect the number of cycles that occur in a fixed given time duration;
   first subtracting logic means, responsive to said number of cycles of said third logic means, for subtracting said number of cycles from said predetermined number of cycles so that said intake valve is open earlier with respect to said crank shaft given phase angle;

second subtracting means, responsive to said number of cycles of said third logic means, for subtracting said number of cycles from said other predetermined number of cycles so that said exhaust valve is also opened earlier with respect to said crank shaft given phase angle;

adding means, responsive to said number of cycles of said third logic means for adding said number of cycles to the number of cycles representing one-half of a revoulation so that said exhaust valve remains open longer than one-half of a revolution of the crank shaft.

5. The installation of claim 4 wherein:

said first means also includes a means for providing a derivative signal indicative of the rate of change of said first signal;

and an ignition means is provided, responsive to said number of signals of said counter, for producing an ignition signal to a respective cylinder; and said ignition means is also responsive to said derivative signal to retard said ignition signal in relation to the rate of change of said first signal.

6. The installation of claim 1 wherein:

seventh means are provided, responsive to said first signal, for supplying and controlling, in response to said first signal, the rate of fuel supply to said engine by said fuel supply means.

7. The installation of claim 6 wherein:

said second means further includes:

frequency means for producing a pulsating current wherein a fixed number of cycles therein represents one revolution of said crank shaft;

a frequency counter responsive to said second signal and to said frequency outputted from said frequency means for counting each cycle of said pulsating current, and for producing numbered signals representing the number of said cycles which have elapsed after said given crank shaft phase angle;

first logic means, responsive to said numbered signals of said frequency counter and in combination with said third means, for detecting when a predetermined number of cycles has been counted by said counter and then producing said third signal;

second logic means, responsive to said numbered signals of said counter and in combination with said fourth means, for determining when another predetermined number of cycles has been counted by said counter and then producing said fourth signal; and said second logic means has means for holding said fourth signal until at least one-half of the number of cycles for one crank shaft revolution has elapsed so that said exhaust valve is open at another predetermined position of said crank shaft and remains open for at least one-half a revolution of said crank shaft.

8. The installation of claim 7 wherein there is provided:

third logic means to detect the number of cycles that occur in a fixed given time duration;

first subtracting logic means, responsive to said number of cycles of said third logic means, for subtracting said number of cycles from said predetermined number of cycles so that said intake valve is open earlier with respect to said crank shaft given phase angle;

second subtracting means, responsive to said number of cycles of said third logic means, for subtracting said number of cycles from said other predetermined number of cycles so that said exhaust valve is also opened earlier with respect to said crank shaft given phase angle;

adding means, responsive to said number of cycles of said third logic means for adding said number of cycles to the number of cycles representing one-half of a revoluation so that said exhaust valve remains open longer than one-half of a revolution of the crank shaft.

9. The installation of claim 8 wherein:

said first means also includes a means for providing a derivative signal indicative of the rate of change of said first signal;

and an ignition means is provided, responsive to said number of signals of said counter, for producing an ignition signal to a respective cylinder; and said ignition means is also responsive to said derivative signal to retard said ignition signal in relation to the rate of change of said first signal.

* * * * *